US011354998B2

(12) United States Patent
Sellathamby et al.

(10) Patent No.: US 11,354,998 B2
(45) Date of Patent: *Jun. 7, 2022

(54) SYSTEMS AND METHODS FOR EARLY WARNING OF SEISMIC EVENTS

(71) Applicant: Weir-Jones Engineering Consultants Ltd., Vancouver (CA)

(72) Inventors: Chris Sellathamby, Victoria (CA); Iain Weir-Jones, Vancouver (CA); Anton Zaicenco, North Vancouver (CA); Toby Evan George Weir-Jones, Warrenton, VA (US); Andrew James Weir-Jones, Vancouver (CA)

(73) Assignee: Weir-Jones Engineering Consultants Ltd., Vancouver (CA)

( * ) Notice: Subject to any disclaimer, the term of this patent is extended or adjusted under 35 U.S.C. 154(b) by 1 day.

This patent is subject to a terminal disclaimer.

(21) Appl. No.: 16/929,928

(22) Filed: Jul. 15, 2020

(65) Prior Publication Data

US 2020/0402384 A1 Dec. 24, 2020

Related U.S. Application Data

(63) Continuation of application No. 16/388,787, filed on Apr. 18, 2019, now Pat. No. 10,755,548, which is a (Continued)

(51) Int. Cl.
*G08B 21/10* (2006.01)
*G01V 1/28* (2006.01)
*G08B 27/00* (2006.01)

(52) U.S. Cl.
CPC ............ *G08B 21/10* (2013.01); *G01V 1/288* (2013.01); *G08B 27/005* (2013.01); *G01V 2210/41* (2013.01)

(58) Field of Classification Search
CPC .... G08B 21/10; G08B 27/005; G08B 29/188; G01V 1/288; G01V 2210/41;
(Continued)

(56) References Cited

U.S. PATENT DOCUMENTS 5,381,136 A 1/1995 Powers et al.
5,910,763 A 6/1999 Flanagan
(Continued)

OTHER PUBLICATIONS

Allen, R.M. (1978). Automatic earthquake recognition and timing from single traces. Bull. Seism. Soc. Am. 68:5, 1521-1532.
(Continued)

*Primary Examiner* — Ryan W Sherwin
(74) *Attorney, Agent, or Firm* — Todd A. Rattray; Oyen Wiggs Green & Mutala LLP

(57) ABSTRACT

A seismic warning system comprises: a plurality of sensors, each sensor sensitive to a physical phenomenon associated with seismic events and operative to output an electronic signal representative of the sensed physical phenomenon; a data acquisition unit communicatively coupled to receive the electronic signal from each of the plurality of sensors, the data acquisition unit comprising a processor configured to estimate characteristics of a seismic event based on the electronic signal associated with a P-wave from each of the plurality of sensors; and a local device communicatively coupled to the data acquisition unit. The plurality of sensors, the data acquisition unit and the local device are local to one another.

20 Claims, 8 Drawing Sheets

Related U.S. Application Data continuation of application No. PCT/CA2017/051251, filed on Oct. 19, 2017.

(60) Provisional application No. 62/410,358, filed on Oct. 19, 2016.

(58) Field of Classification Search
CPC ........... G01V 2210/1232; G01V 1/008; G01V 2210/65; G01V 2210/72
See application file for complete search history.

(56) References Cited

U.S. PATENT DOCUMENTS

| | | | |
|---|---|---|---|
| 6,356,204 B1* | 3/2002 | Guindi | G01V 1/008 340/665 |
| 7,005,993 B2 | 2/2006 | Webb et al. | |
| 8,452,540 B2 | 5/2013 | Sugawara et al. | |
| 8,720,470 B2 | 5/2014 | Hosseini et al. | |
| 8,787,871 B2 | 7/2014 | Givens et al. | |
| 9,372,272 B2 | 6/2016 | Price et al. | |
| 10,755,548 B2* | 8/2020 | Sellathamby | G08B 21/10 |
| 2011/0037588 A1 | 2/2011 | Zeng et al. | |
| 2013/0328622 A1 | 12/2013 | Chiu | |
| 2013/0328688 A1 | 12/2013 | Price et al. | |
| 2014/0187142 A1 | 7/2014 | Liu et al. | |
| 2014/0266762 A1* | 9/2014 | Warren | G08B 21/10 340/690 |
| 2015/0195693 A1 | 7/2015 | Hooriani et al. | |
| 2016/0054460 A1 | 2/2016 | Jackson et al. | |

OTHER PUBLICATIONS

Atwater, T. (1970). Implications of plate tectonics for the Cenozoic tectonic evolution of western North America, Geological Society of America Bulletin. 81, 3513-3536.

Balfour, N. (2011). Sources of Seismic Hazard in British Columbia: What Controls Earthquakes in the Crust? PhD dissertation, the School of Earth and Ocean Sciences, University of Victoria.

Cassidy, J., Rogers, G. (1999). Seismic site response in the greater Vancouver, British Columbia, area: spectral ratios from moderate earthquakes, Can Jeotech. J., 36: 195-209.

Cassidy, J., Rogers, G. and Waldhauser, F. (2000). Characterization of active faulting beneath the Strait of Georgia, British Columbia, Bulletin of the Seismological Society of America, 90(5): 1188-1199.

Cramer, H. and Leadbetter, M.R. (1967). Stationary and related stochastic processes, Wiley, New York.

Goldfinger, C., Grijalva, K., Burgmann, R., Morey, A. E., Johnson, J. E., Nelson, C. H., Gutierrez-Pastor, J., Ericsson, A., Karabanov, E., Chaytor, J. D., Patton, J. and Gracia, E. (2008). Late Holocene Rupture of the Northern San Andreas Fault and Possible Stress Linkage to the Cascadia Subduction Zone, Bulletin of the Seismological Society of America, 98(2): 861-889.

Hyndman, R., Yorath, C., Clowes, R. and Davis, E. E. (1990). The northern Cascadia subduction zone at Vancouver Island: seismic structure and tectonic history, Canadian Journal of Earth Science. 27, 313-329.

Jun Saita, Tsutomu Sato, Yutaka Nakamura. (2008). What is the Useful Application of the Earthquake Early Warning System?, 14th WCEE, Beijing, China, Oct 12-17.

Kanamori, H., (2005). Real time seismology and earthquake damage mitigation, Ann. Rev. Earth Planet Sci., 33(1), 195-214.

Weir-Jones, I., Shaking Things Up. Canadian Mining Journal Editor, Feb. 1, 2012.

Riddihough, R. (1984). Recent movements of the Juan de Fuca plate system, Journal of Geophysical Research, 89 (B8): 6980-6994.

Rogers, G.C. (1998). Earthquakes and earthquake hazard in the Vancouver area. Clague JJ, Lutemauer JL, Mosher DC, Editors. Geology and natural hazards of the Fraser River delta, British Columbia. GSC Bulletin, 525: 17-25.

Seed, H.B., Lysmer, J., and Schnabel, P.B. (1992). Shake-91: Equivalent Linear Seismic Response Analysis of Horizontally Layered Soil Deposits, Department of Civil Engineering, University of California, Berkeley.

Wu, Y.M., and Kanamori, H. (2008). Development of an Earthquake Early Warning System Using Real-Time Strong Motion Signals. Sensors, 8:1-9.

Zaicenco A., Alkaz V. (2008). Numerical solution of an elastic wave equation using the spectral method, In: Harmonization of Seismic Hazard in Vrancea Zone, Editors: Zaicenco A., Craifaleanu I., Paskaleva I., Springer, NATO Science for Peace and Security Series C: Environmental Security, pp. 319-327.

Zaicenco, A., Huffman, S., Weir-Jones, I. (2010). Seismic P-wave polarization in the context of on-site early warning system. 5th Intl. Conf on Recent Advances in Geotech. Eq. Eng. And Soil Dyn., San Diego, CA, paper #3.12a.

Zaicenco, A., Weir-Jones, I. (2011). Elastic wave polarization using EMD vs. Fourier and wavelet basis. SEG Expanded abstracts, San Antonio, Sep. 18-23, 30:4388-4392.

Zollo, A., Amoroso, O., Lancieri, M., Wu, Y.-M. and Kanamori, H. (2010). A threshold-based earthquake early warning using dense accelerometer networks, Geophys. J. Int., 183: 963-974.

Zaicenco, A., Weir-Jones, I., (2012). Lessons Learned from Operating an On-site Earthquake Early Warning System. 15 WCEE Lisboa 2012.

Onur, T., Ventura, C., Tao, S. (2001). Strong Motion Records from the Feb. 28, 2001 Nisqually Earthquake Recorded by Three Structural Arrays in BC, Report EQ 01-02, UBC Earthquake Engineering Research Lab.

* cited by examiner

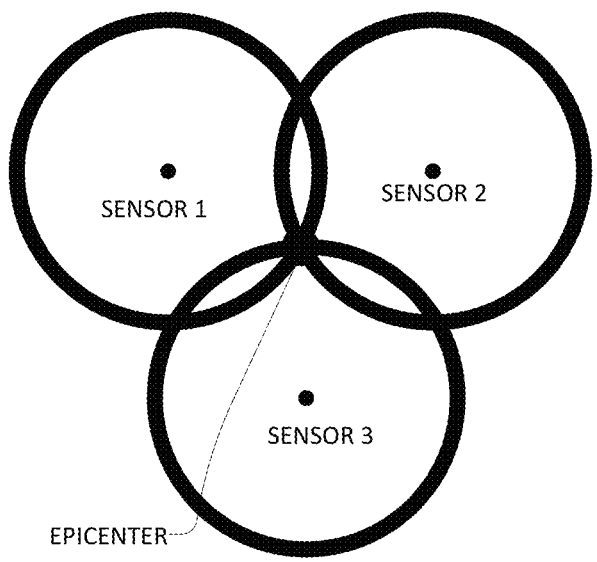
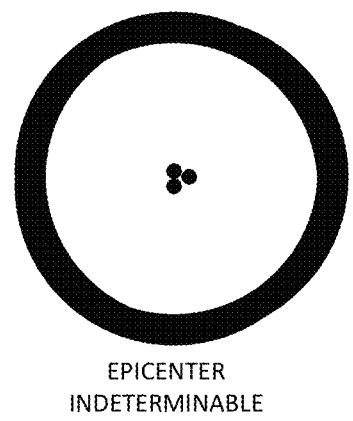
PRIOR ART
PRIOR ART
FIG. 1A
FIG. 1B
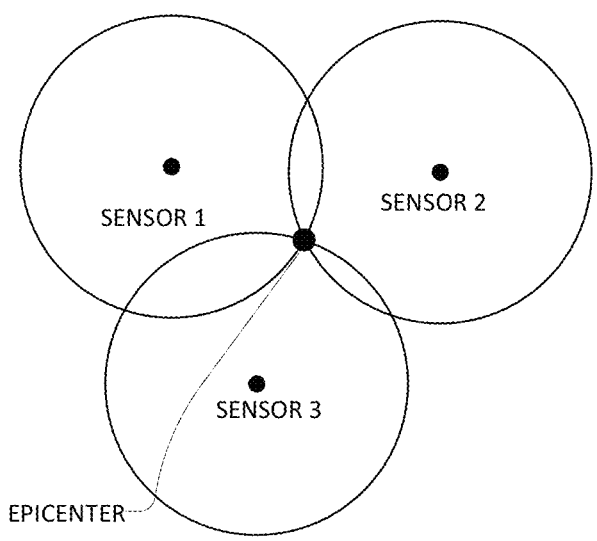
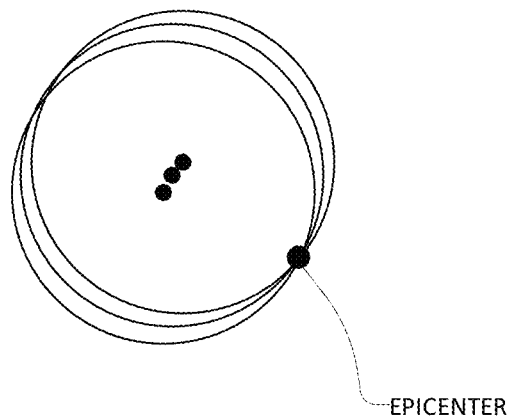
FIG. 2A
FIG. 2B

SYSTEMS AND METHODS FOR EARLY WARNING OF SEISMIC EVENTS

RELATED APPLICATIONS

This application is a continuation of U.S. application Ser. No. 16/388,787 filed 18 Apr. 2019, which is itself a continuation of Patent Cooperation Treaty (PCT) application No. PCT/CA2017/051251 having an international filing date of 19 Oct. 2017, which in turn claims the benefit of the priority of U.S. application No. 62/410,358 filed 19 Oct. 2017 and which, for the purposes of the United States, claims the benefit under 35 USC 119 in relation to U.S. application No. 62/410,358 filed 19 Oct. 2017. All of the applications referenced in this paragraph are hereby incorporated herein by reference.

TECHNICAL FIELD

Systems and methods provide early detection of seismic events (e.g. earthquakes), determine characteristics of detected seismic events, take actions to minimize damage in view of detected seismic events, take actions to minimize injury in view of detected seismic events and/or provide situational alarms and/or recommendations to user(s) in view of detected seismic events.

BACKGROUND

Sensors may be used to detect earthquakes. Some such sensors may also be used in earthquake early warning systems (EEWS) to determine (or estimate) characteristics of earthquakes, such as the epicenter or hypocenter of the earthquake, the magnitude of the surface wave associated with the earthquake and the time of arrival of the surface wave associated with the earthquake. The sensors of prior art earthquake detection systems are generally placed several tens of kilometers or several hundreds of kilometers apart, with the earthquake detection systems comprising data acquisition equipment at each spaced-apart sensor location. This large separation between sensors is typically required in most prior art systems, since most prior art systems have a timing accuracy on the order of seconds or hundreds of milliseconds. The placement of such sensors in close proximity is not possible, where it is desired to know the epicenter of the seismic event, since the epicenter would not be detectable.

Data acquisition equipment (typically located at the same location as the sensors) may be used to log detected data. U.S. Pat. No. 5,381,136 (Powers et al.) describes a remote logger unit for monitoring a variety of operating parameters along a fluid distribution or transmission system. An RF link is activated by which a logger unit alerts a central controller when predetermined operating limits are exceeded. Relatively more distal logger units transmit data to a central controller via relatively more proximate logger units in daisy chain fashion.

U.S. Pat. No. 8,452,540 (Sugawara et al.) describes an earthquake damage spread reducing method and an earthquake damage spread reducing system, for use in a semiconductor manufacturing apparatus, which can predict occurrence of an earthquake and prevent fall down of a boat, thus minimizing damage by the earthquake. An earthquake damage spread reducing system includes a receiving unit for receiving urgent earthquake information, based on preliminary tremors, distributed via a communication network, or alternatively, includes a preliminary tremors detection unit for directly detecting the preliminary tremors. A control unit performs a first step of stopping operation of a semiconductor manufacturing apparatus, based on the urgent earthquake information received or on the preliminary tremors detected, as well as performs a second step of holding a boat to prevent fall of the boat, in which objects to be processed are loaded in a multistage fashion.

US Patent Application No. 2014/0187142 (Liu et al.) describes a seismic alarm system designed to alarm users of an upcoming seismic event and other natural disasters, and aid victims' survival after an earthquake. The seismic alarm system includes an accelerometer, a controller, an acoustic-to-electric transducer for acoustic pattern detection, and RF module to receive emergency radio signals. The alarm system has central controlling unit that sets off an alarm after processing signals from several modules and components. The accelerometer detects seismic P wave acceleration changes for early earthquake detection. The acoustic-to-electric transducer detects human acoustics or predetermined acoustic patterns, then initiates an alarm that brings rescue attention to survivors. The RF module is tuned to receive emergency radio signals.

U.S. Pat. No. 5,910,763 (Flanagan et al.) describes a system that provides an area warning to a specific general population of an earthquake prior to the arrival of the hazardous ground motion typically associated with earthquakes, and of approaching natural disasters that could impact an area. This area advanced warning thereby provides time for users to seek shelter and through automated means to reduce property damage as well as injuries and lives lost. A preferred embodiment utilizes a plurality of "Local Station Detector Sites", equipped with earthquake seismic motion detectors and microprocessors designed to provide a profile of existing ground motion to a "Central Processing Site" in conjunction with further analysis of similar signals from multiple sites. A warning instruction is then transmitted back to all appropriate Local Station Detector Sites to initiate transmission of local area warnings to a general population of all users in an appropriate and specific geographic area with minimal possibility of false alarms. Additionally all Local Station Detector Sites are equipped to receive notification transmissions from the Central Processing Site, which have been initiated by "Public Safety Offices" for other natural disasters, and transmit appropriate warning signals to the general population of users in specific geographic areas.

US Patent Application No. US2015/0195693 (Hoorianin et al.) describes a mobile phone and tablet-based earthquake early warning system that utilizes the on board accelerometer, gyroscope, GPS and other location and movement sensing technologies built into today's mobile smart phones and tablet devices to detect an earthquake event and send an alarm to those in nearby locations that could be adversely affected by the event.

Existing EEWS systems use various data acquisition techniques to obtain seismic activity measurements. Seismic activity measurements reveal risks of potential damage from earthquakes and provide early warning of the arrival of the S-wave (secondary wave) associated with an earthquake, making such measurements useful for preventing and/or minimizing human injury/death and damage to property. When an earthquake occurs, casualties and damage are typically positively correlated with preparedness and amount of warning time.

The US Geological Survey states that early warning of earthquakes "can give enough time to slow and stop trains and taxiing planes, to prevent cars from entering bridges and tunnels, to move away from dangerous machines or chemicals in work environments and to take cover under a desk, or to automatically shut down and isolate industrial systems. Taking such actions before shaking starts can reduce damage and casualties during an earthquake. It can also prevent cascading failures in the aftermath of an event. For example, isolating utilities before shaking starts can reduce the number of fire initiations."

The Federal Emergency Management Agency (FEMA) has estimated the average annualized loss from earthquakes, nationwide, to be $5.3 billion. The Seismological Society of America states that "Earthquake Early Warning Systems (EEWS) could also reduce the number of injuries in earthquakes by more than 50%."

Many countries, including the US, Canada and Japan, are investing in the deployment of EEWS, as are government authorities at other levels.

The Seismological Society of America states that EEWS, "like warnings for other natural disasters, such as tornadoes, hurricanes, and tsunamis, is a forecast of activity that is imminent. However, unlike hurricane warnings, which can come days in advance of severe weather, or tsunami warnings, which build over the course of a few minutes to a few hours before the tsunami makes landfall, earthquakes have a much shorter lead time, shorter even than a funnel cloud that starts spiraling toward the earth. A warning could be just seconds. This short warning time is a product of the physical process of an earthquake rupture. EEWS typically use seismometers to detect the first signature of an earthquake (P-wave), to process the waveform information, and to forecast the intensity of shaking that will arrive after the S-wave. For local EEWS installations, the P-wave is detected onsite (i.e., at the user location), and the difference between the P- and S-wave arrival times defines the maximum alert time. For regional networks, the P-waves are detected by sensors closest to the epicenter, and estimates are immediately relayed to earthquake alerting applications (TV, smart phones, radio, etc.) to provide businesses, citizens, and emergency responders more advance knowledge of the expected arrival and intensity of shaking at their location."

Prior art EEWS systems make use of electronic sensors measure physical quantities (such as velocity, acceleration strain, temperature, crack, pressure, etc.) and convert these physical quantities into signals using suitable reading instruments (e.g. transducers). The particular reading instrument varies depending on the type of sensor. For example, geophones typically incorporate a wire coil with a magnet in the middle that is free to move. As the sensor shakes or vibrates (as is the case during an earthquake), the magnet moves through the coil producing a current, which can be measured to record the variations. To determine the epicenter and the magnitude of an earthquake in accordance with prior art EEWS systems, three to four sensor locations (typically spaced apart by tens of kilometers or hundreds of kilometers) detect the earthquake and communicate with each other to exchange data. The accuracy of epicenter and magnitude predictions depends on the time synchronization between sensor locations and network communication speed between sensor locations.

While existing EEWS systems provide some early warning and damage reduction capabilities, they have at least the following deficiencies:

To accurately detect the epicenter and magnitude of the earthquake, the sensors must typically be located relatively far apart (typically 10's or 100's of km) from one another, since the timing accuracy of the systems is on the order of seconds or hundreds of milliseconds. Data from all sensors of interest must typically be gathered and correlated, and the data must then be processed before determining if a warning is to be issued. When sensor locations are hundreds of kilometers apart, gathering, correlating and processing data are time consuming, thereby reducing potential warning time. Some EEWS systems, for example, the system described in U.S. Pat. No. 9,372,272 (Price et al.) comprise sensors that can be placed less than 500 m apart from each other; however, such sensors must be hard wired to a central controller. This is undesirable. First, installation is difficult and complicated since long cables must be installed, which may require digging channels in the earth or through concrete. Second, the long length of the cables could lead to signal degradation and unwanted noise, resulting in unreliable detection of the P-wave signal.

Existing EEWS system employ centralized processing of data, which typically involves transmittal of large amounts of data, resulting in a corresponding need for high bandwidth, highly reliable and costly network infrastructure.

Existing EEWS systems also have a need to transfer high volumes of data via network communications. These data transfer requirements dictate a corresponding need for high bandwidth network capability. Establishing and/or maintaining high bandwidth networks over large areas and/or remote locations can be very difficult and costly.

Generating a warning with time to arrival of the damaging S-wave requires sensors at multiple locations with time synchronization between locations and high quality network communication between locations. The network communication must be able to transmit signals between the various components of the system with minimal latency in order to be an effective EEWS. There is thus a high need for low latency network communications which may not be readily available at all times.

When sensors are far apart, the geology from the epicenter to each sensor can differ significantly. Such geological differences may result in inaccurate prediction of the time and magnitude of the oncoming S-wave. Alternatively, such geological differences require the use of accurate geological models which are costly and time consuming to generate.

When existing EEWS systems issue warnings, these warnings are blanket warnings to all within the warning area. It is up to the individuals or organizations within the warning area to interpret the warning, assess the danger and take any desired actions. Some choose to do nothing simply because they do not know what to do or do not think they are in danger. Prior art EEWS systems have no knowledge an individual's or organization's situation or location or least do not incorporate any such knowledge into any applicable recommended courses of action. For instance, if an individual is driving on the freeway, the recommendation should be to pull over safely and stop. However, if the individual is driving in a tunnel, pulling over and stopping inside the tunnel is not the correct action. The preferred action would be to drive through the tunnel and then pull over and stop. As another example, because the generic warnings issued by prior art EEWS systems lack situational awareness within the warning area, such generic warnings can result in an organization unnecessarily shutting down equipment or processes, which can cause unnecessary losses and create more harm than good. Still further, generic warnings (without situational awareness) issued by prior art EEWS systems can cause unnecessary panic.

In many existing EEWS systems, the decision-making and actions are left for individual manual execution, which is unreliable and inefficient. In many cases, manual execution is not possible due to the short time available prior to arrival of the damage-causing S-wave. Manual execution is prone to errors. Shutdown of critical equipment typically requires concentration and thought, which may be lacking in panic-driven conditions.

Some existing EEWS systems do incorporate autonomous decision-making, but these EEWS systems have been historically unreliable, are expensive or non-viable, and/or have a false-positive ratio which is too high. In addition, these autonomous EEWS systems must typically be placed over a wide area with complicated networking schemes that make them impractical for use by smaller scale businesses and individuals. These autonomous EEWS systems are typically limited to large-scale deployment by government institutions or the like. Some existing autonomous EEWS systems have not operated reliably when earthquakes actually occur. These systems may work well in the laboratory under simulated or mechanically generated vibration conditions, but can tend to fail during actual earthquakes. Also, earthquakes do not occur regularly, making it difficult to perform thorough field testing.

Existing EEWS systems only allow for one-way communication from the EEWS system to individuals (affected individuals and emergency response teams) in the warning zone over communication channels which typically require high priority and reliability. Emergency response teams typically use their own communication methods which are only accessible to the public through single points of entry, such as dedicated (call-in) phone numbers. The mere volume of calls during a disaster makes these call-in numbers congested resulting in long wait times. Other than such call-in numbers, there is no provision in existing EEWS systems for affected individuals to communicate back to emergency response teams, family and friends. As a result, affected individuals and emergency response teams may be tend to rely on other available communication services, such as social media, to communicate their condition, location and emergency needs. This individual use of distributed communication channels such as social media is highly inefficient and unreliable, especially when data networks become congested in the affected area (as is typical). Also, not all people affected are connected via social media and not all emergency response teams monitor social media. Further, general data communications over communication networks during a disaster can get highly congested due to the high volume of messages and messages typically do not receive high priority.

Some existing EEWS systems, such as the one depicted in US Patent Application No. 2015/0195693 (Hooriani et al.), use sensors in mobile phones and tablets to detect earthquakes and provide warnings. However, such sensors cannot detect the P-wave and can only detect large movements of the S-wave, so they cannot provide a warning of a pending S-wave.

Existing EEWS systems do not monitor the surrounding structures and equipment, so any damage resulting from a seismic event cannot be qualified and quantified. Existing EEWS systems report on the seismic event parameters only and have no knowledges of parameters (other than those of the seismic event) in the region in which the warning is issued. It is up to the use of the existing EEWS system to determine the safety risks and/or potential damage that is likely to result from a seismic event. It would be useful to know if the damage from a seismic event results in (or would be likely to result in) safety risks to the personnel using the equipment or utilizing the structure. Alarms and warning can then be issued as necessary to prevent further injuries or damage.

Accordingly, there is a general desire for systems and methods for early warning of seismic events that make use of autonomous actions, which autonomous actions may be executed quickly and efficiently, without the need for manual intervention. There is a general desire for such systems and methods to overcome or at least ameliorate some the drawbacks with prior art EEWS systems.

There is also a general desire for systems and methods for early warning of seismic events which incorporate situational awareness into any warnings that are issued in the event of a seismic event.

There is also a general desire for systems and methods for early warning of seismic events which can monitor and/or control communications (e.g. multi-way communications) through a suitable communication network.

There is also a general desire for systems and methods for early warning of seismic events which provide and maintain reliable, secure and rapid communications.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF THE DRAWINGS

FIGS. 1a and 1b (collectively, "FIG. 1") are schematic diagrams illustrating the operability of sensors of prior art EEWS.

FIGS. 2a and 2b (collectively, "FIG. 2") are schematic diagrams illustrating the operability of sensors used in EEWS according to particular embodiments of the invention.

DETAILED DESCRIPTION

Figure 3:
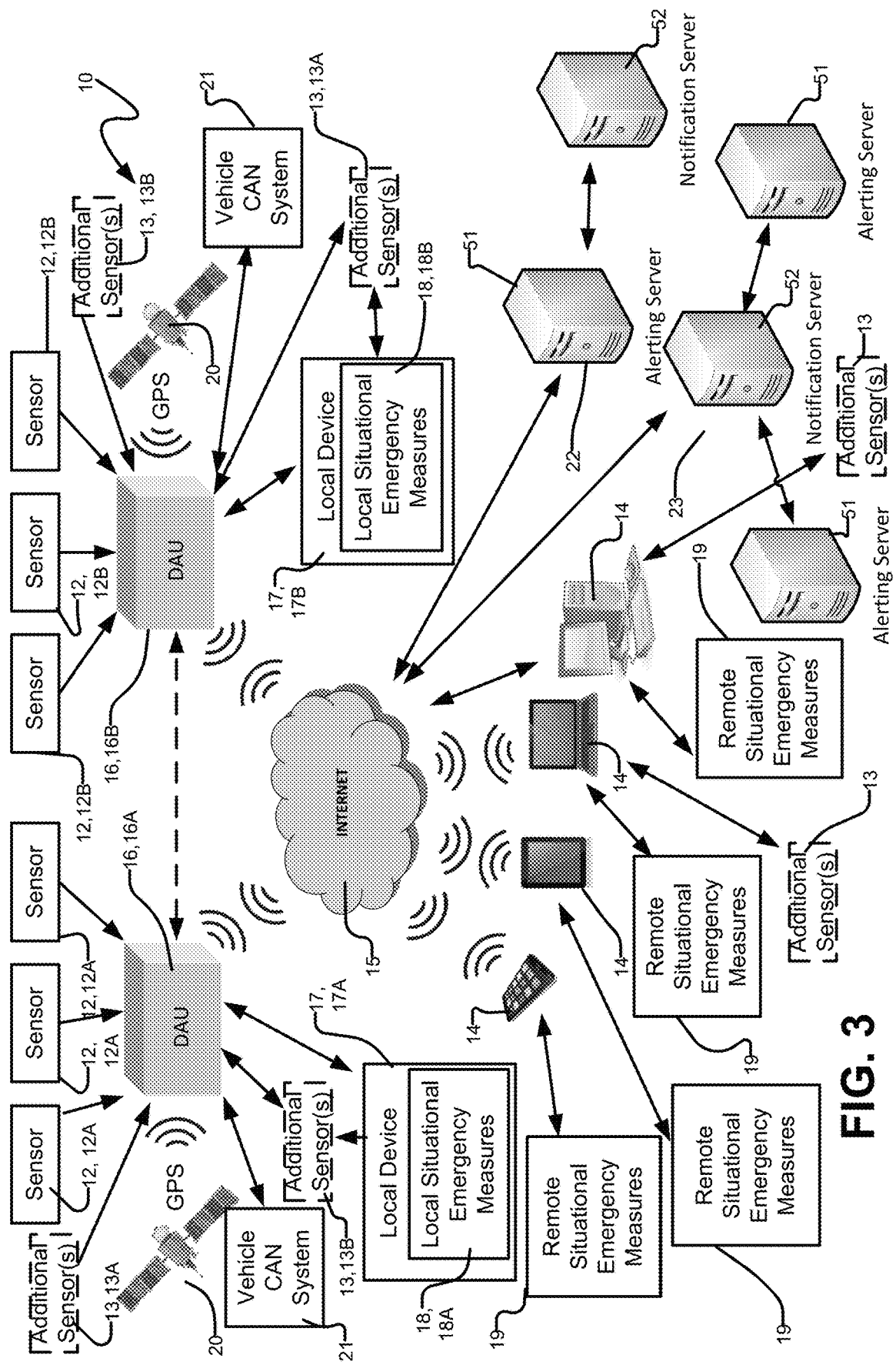
FIG. 3 is a schematic diagram of a system for early warning of seismic events according to an exemplary embodiment of the invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide systems and methods for early warning of seismic events. Such systems and methods may comprise a plurality (e.g. three) separate technologies combined to operate as a flexible condition monitoring and event prediction system—data acquisition technology, sensor technology and event prediction software technology.

The sensors of prior art EEWS are generally placed tens to hundreds of kilometers apart, with the EEWS comprising data acquisition equipment at each sensor location. This large separation between sensors is typically required in most prior art systems, since most prior art systems have a timing accuracy on the order of seconds or hundreds of milliseconds. The need for sensors to be spaced apart by such distances is illustrated schematically by FIG. 1. FIG. 1A illustrates three prior art sensors that are relatively widely spaced apart. The thickness of the lines that surround the FIG. 1A sensors are representative of the timing accuracy of the prior art sensors. When the sensors are spaced apart from one another (as shown in FIG. 1A), the epicenter of an earthquake event (which is represented by the intersection of the three sensor circles) can be detected, despite relatively coarse timing accuracy of the sensors. In contrast, when the sensors are located relatively close to one another, as is the case in FIG. 1B, the timing inaccuracy of the sensors obscures the location of the epicenter—i.e. it is not possible to determine the location of the intersection of the three circles surrounding the sensors.

EEWS systems according to particular embodiments of the invention comprise sensors which take advantage of recent sensor developments which provide sensors with noticeably improved timing accuracy. This is shown schematically in FIG. 2, where the timing accuracy of the sensors is much better (corresponding to circular lines having less thickness). FIG. 2A illustrates three relatively widely spaced apart sensors of the type used in EEWS according to particular embodiments of the invention. Like FIG. 1A described above, when the sensors are spaced apart from one another (as shown in FIG. 2A), the epicenter of an earthquake event can be detected to be the intersection of the three sensor circles. However, unlike the prior art circumstance, with accurate sensors, the intersection of the sensor circles can still be determined, even when the sensors are located relatively close to one another, as is the case in FIG. 2B.

In particular embodiments, the ability to locate sensors relatively close to one another is exploited to provide new EEWS functionality and performance as described further herein.

Figure 4:
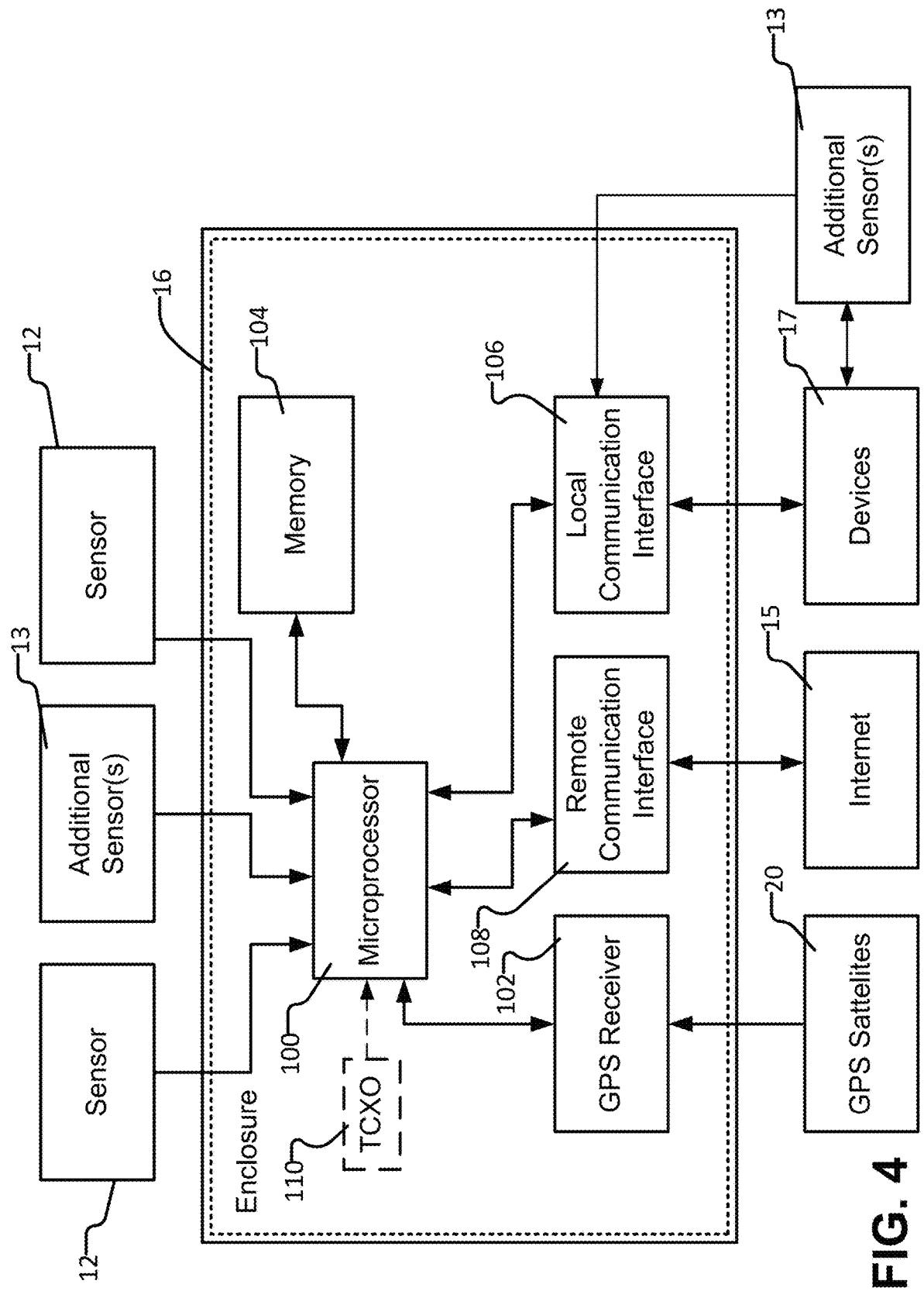
FIG. 4 is a schematic diagram of the components within a data acquisition unit (DAU) according to an exemplary embodiment of the invention.
Figure 5:
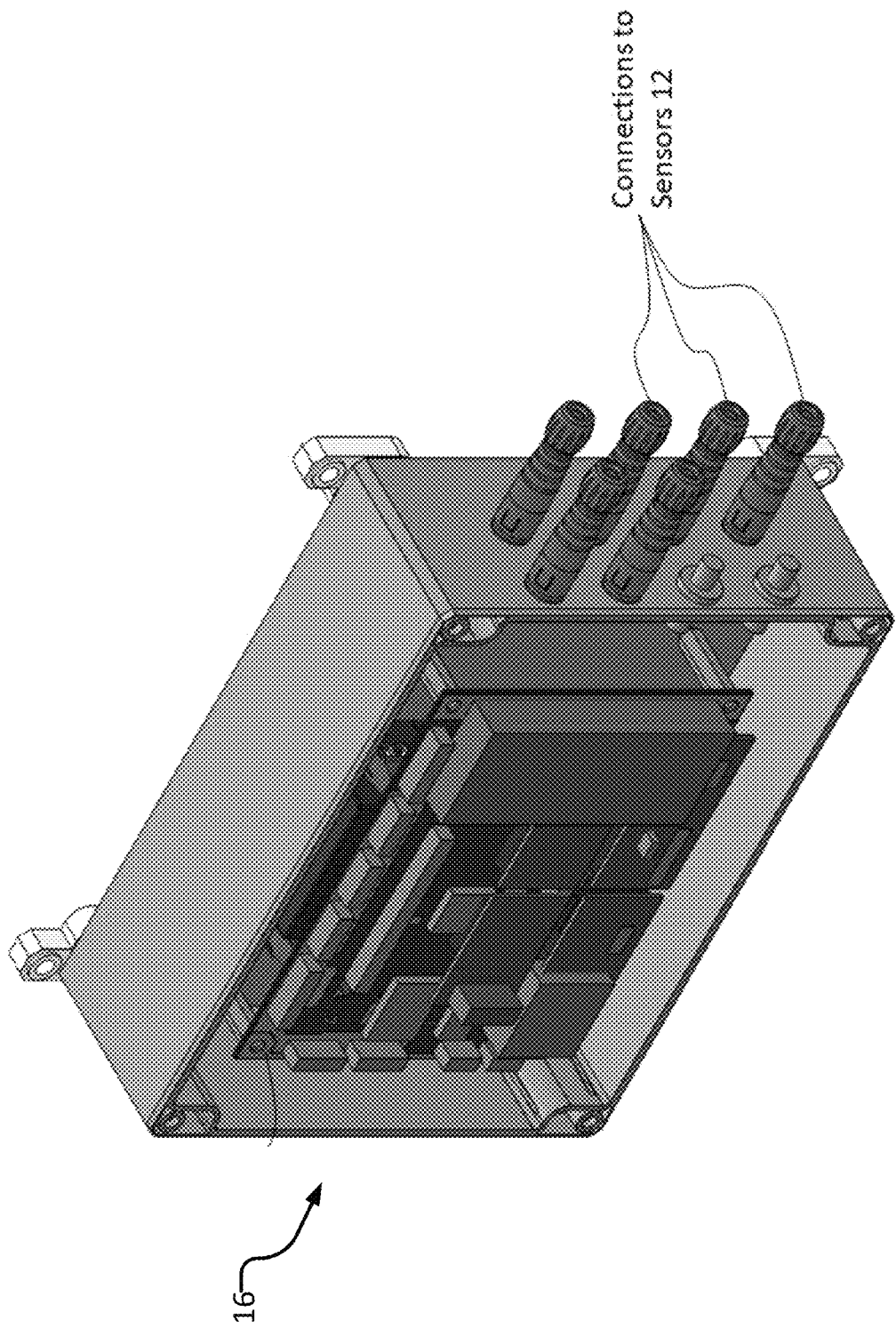
FIG. 5 is a diagram of the hardware of an exemplary DAU according to an exemplary embodiment of the invention.
Figure 6:
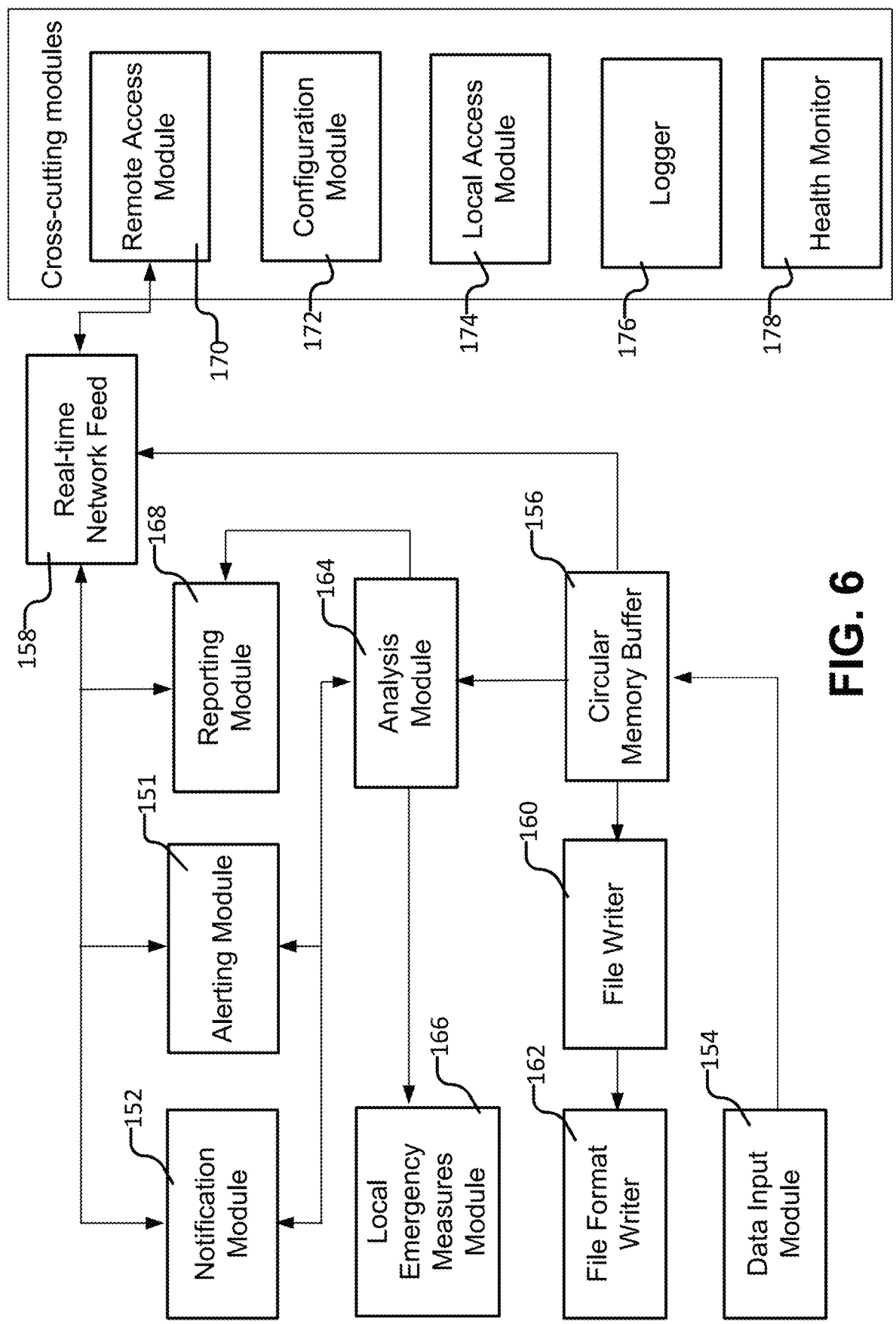
FIG. 6 is a block diagram illustrating the different software modules of the software application installed on a DAU and their interconnectivity according to an exemplary embodiment of the invention.

FIG. 3 is a schematic diagram of a system 10 for early warning of seismic events according to a particular exemplary embodiment of the invention. System 10 of the FIG. 3 embodiment comprises one or more DAUs 16. FIG. 4 is a schematic block diagram representation of an exemplary DAU 16. Referring to FIG. 4, DAU 16 may comprise, without limitation, any or all of the illustrated features to help ensure reliable operation in harsh environments. FIG. 5 is a diagram of the hardware of a DAU 16 according to an exemplary embodiment. FIG. 6 is a block diagram illustrating the different software modules executed by processor 100 of DAU 16 according to an exemplary embodiment of the invention.

System 10 of the FIG. 3 embodiment comprises a number of sensors 12. Sensors 12 may comprise a wide range of proven sensor options to measure or sense a correspondingly wide range of phenomena. Sensors may be used to detect P-waves and S-waves, which signal the presence or absence of a seismic event. For example, the sensor options used for detecting P-wave and S-wave may comprise, without limitation, any or all of:
  single or multi-axial velocity sensors (or geophones);
  single or multi-axial acceleration sensors;
  piezometric patch sensors;
  MEMS velocity and acceleration sensors;
  combinations of the above; and/or
  the like.

System 10 may also comprise or be operatively connected to additional sensors 13 which may be used for controlling and/or monitoring external equipment, building structures and/or other infrastructure (not shown). Such sensors 13 may, for example, be used to provide information to help control the proper shutdown of equipment, to verify the shutdown of equipment when a seismic event has been detected, to monitor the effect of an earthquake on building structures and/or equipment and quantify the damage that could have been or could possibly be done to such structures and/or equipment and/or the like. The sensor options used for such sensors 13 may comprise, without limitation, any or all of:
  strain sensors;
  temperatures sensors;
  hall effect sensors for controlling and verifying the shutdown of equipment;
  visual sensors;
  acoustic sensors;
  pressure sensors;
  flow sensors;
  humidity sensors;
  sensors for detecting fluid levels;
  combinations of the above; and/or
  the like.

System 10 (and the corresponding method of operating system 10) provides for early warning of seismic events. System 10 may comprise one or more of its own sensors 12 for detecting seismic events such as those listed above. System 10 may additionally or alternatively be retrofitted to interface with the sensors 12 of a previously installed system. System 10 may incorporate software and/or apps (not expressly shown in the drawing) which may operate on any combination of DAUs 16 (specifically, microprocessor 100 of DAU 16—see FIG. 4), servers 51, 52, local devices 17 and/or user computing devices 14. System 10 (through sensors 12 and DAUs 16) may provide any or all of detection of seismic events (detection of P-waves and/or S-waves), data analysis, determination of event characteristics (e.g. epicenter estimation, magnitude estimation, and/or the like), predictive damage assessment, predictive time to event arrival, damage prevention, early warning, situational alarming, and reliable emergency communication as further explained below.

Referring to FIG. 3, system 10 comprises one or more DAUs 16 and one or more sensors 12 corresponding to each DAU 16. In the illustrated embodiment of FIG. 3, system 10 comprises a first DAU 16, with one or more corresponding sensors 12A and a second DAU 16B with one or more corresponding sensors 12B. DAUs 16A, 16B and their corresponding sensors 12A, 12B may be collectively referred to herein as DAUs 16 and sensors 12. Components of system 10 (e.g. DAUs 16, sensors 12, devices 17 and sensors 13) can operate locally (i.e. in relatively small environments) and can implement local situational emergency measures (recommendations) 18A, 18B [collectively, local situational emergency measures (recommendations) 18], which are specific to particular locations in which such local situational emergency measures 18 are implemented and/or to specific conditions in existence at the locations where, and/or times when, such local situational emergency measures 18 are implemented. Such specific conditions may be based on output from additional sensors 13. Local situational emergency measures 18 may be communicated to and implemented on or via any suitable local device 17A, 17B (collectively devices 17) capable of local communication with DAU 16. For example, local situational emergency measures 18 may be communicated to the embedded controller/processor associated with a piece of industrial equipment, building structure or other infrastructure (device 17) and may be implemented by causing the controller/processor to assume emergency control of the operation and/or shut down of the equipment, building structure or other infrastrcture or by causing the controller/processor to display a suitable warning message to the operator of the equipment, building structure or other infrastrcture. As another example, local situational emergency measures 18 may be communicated to a more general purpose computing device 17 which may be programmed or otherwise configured to take any suitable emergency measures. Where local devices 17 have sufficient capability, suitable software operating on local devices 17 may be used to interrogate specific local conditions and may be used in whole or in part to implement local situational emergency measures 18. Device 17 may comprise other types of devices (e.g. audible alarms, optical warning indicators, PA systems and/or the like.

In particular embodiments, the concept of locality means that each DAU 16, its corresponding sensors 12, any device 17 to which corresponding local situational emergency measures 18 are communicated and/or by which corresponding local situational emergency measures 18 are implemented and any local sensors 13 do not depend on network connectivity to other systems or components of system 10 that are installed at relatively large distances (e.g. 10s and 100s of km) away. Components of system 10 that are hardwired to one another or which can communicate through a local area network LAN, may be considered to be local, but components requiring larger communication networks, such as the internet 15 or a cellular communication network are not considered to be local. For example, in some embodiments, the separation of the closest pairs of sensors 12A or sensors 12B of system 10 may be less than 100 m. In some embodiments, this separation is less than 50 m, making system 10 suitable for deployment in residential properties or in small industrial operations.

System 10 may also operate remotely. For example, DAUs 16 which detect a seismic event may communicate to remote computing devices 14 over the internet 15 or other wide area network and may implement remote situational emergency measures 19. Remote computing devices 14 may comprise any computing device 14 capable of operating operational software. FIG. 3 shows a number of exemplary and non-limiting types of such computing devices 14—e.g. desktop computers, laptop computers, tablets, phones, other forms of personal internet devices (PIDs) and/or the like. Remote computing devices 14 may additionally or alternatively comprise suitable embedded processors which may be provide part of larger systems, equipment, building structures and/or other infrastructure. By way of non-limiting example, remote computing devices 14 may comprise a processor embedded in a vehicle (e.g. in an automobile or plane), a processor embedded in other equipment (e.g. industrial equipment), a processor associated with the monitoring of a bridge or tunnel and/or the like.

Other than being remote (e.g. separated from DAUs 16 by the internet 15 or other wide area network), remote situational emergency measures 19 may be similar to local situational emergency measures 18. That is, remote situational emergency measures 19 may be specific to the locations where they are implemented and may depend on specific conditions in existence at the locations where and/or times when they are implemented. Such specific conditions may be based on output from additional sensors 13. In the illustrated embodiment of FIG. 3, remote situational emergency measures 19 are schematically depicted as being communicated to various types of computing devices 14 which may implement remote situational emergency measures 19. This is not necessary, however, and, like local situational emergency measures 18, remote situational emergency measures 19 may be communicated to and/or implemented by any suitable devices capable of communicating with DAUs 16 over the internet 15 or other wide area network. Where remote devices 14 have sufficient capability, suitable software operating on remote devices 14 may be used to interrogate specific local conditions and may be used in whole or in part to implement, effect or otherwise provide remote situational emergency measures 19. For example, a remote device, such as a mobile phone 14, may have the ability to detect its current location (e.g. via a GPS receiver). Accordingly, in some embodiments, DAU 16 and/or alerting server 51 (described further below) may issue an alert comprising some information about a seismic event and software resident on the phone 14 may consider the current location of the phone 14 relative to the seismic event and/or other information specific to the location of the phone 14 before issuing a situational emergency measure 19 that depends on the location of the phone 14.

FIGS. 4 and 5 show different schematic views of the hardware components of a DAU 16 according to a particular embodiment. DAU 16 comprises a suitable processor 100 which may be programmed or otherwise configured to provide the functionality and perform the methods described herein. FIG. 6 shows a block diagram illustrating the different software modules which may be executed by processor 100 of DAU 16 according to an exemplary embodiment of the invention. Some of the software executed by processor 100 may be resident on a memory 104 accessible to processor 100. Memory 104 may also be used to record data received from sensors 12. The FIG. 6 software modules are explained in more detail below.

Referring to FIG. 4, processor 100 of DAU 16 is connected to receive outputs from sensors 12 and optionally from additional sensors 13 directly or through corresponding devices 17. DAU 16 and/or sensors 12, 13 may comprise signal conditioning circuitry (e.g. amplifiers, DACs, buffers, filters and/or the like not shown) which is well known to those skilled in the art. DAU 16 of the illustrated embodiment comprises a GPS receiver 102 that is connected to receive signal from GPS satellites 20. Such signals received by GPS receiver 102 may provide location information and timing information. DAU 16 of the illustrated embodiment comprises a local communication interface 106, via which DAU 16 can communicate local situational emergency measures 18 to local devices 17 (or to sensors 13 associated with local devices 17). In some embodiments, local communication interface 16 may comprise a hard-wired interface between devices 17, sensors 13 and DAU 16, although this is not necessary. In some embodiments, local communication interface 16 comprises a wireless communication interface. DAU 16 of the illustrated embodiment comprises a remote communication interface 108 (e.g. an internet communication interface) which may be used to communicate remote situational emergency measures 19 to devices 14 via the internet 15 or other wide area network. Remote communications interface 108 may comprise a wired and/or wireless communications interface.

In some embodiments, each sensor 12 is connected to a corresponding single DAU 16 via hard-wired communications (or also referred to as local connections or local communications). In some embodiments, each sensor 12 is connected to its own dedicated DAU 16 via hard-wired communications. In such embodiments, the need for using long running cables to connect the sensors 12 to a single DAU 16 may be avoided. This avoids the need to dig ditches in the earth, bore holes through concrete or other structures and the like to fish had-wired cables and reduces the risk of signal degradation in a long cable; resulting in a system which is more reliable and easier to install. Hard-wired connection may be more desirable than wireless connection because hard-wired communications permit data from sensors 12 to be processed by DAU 16 relatively quickly (as compared to prior art systems relying on communication of sensor information over communication networks), enabling correspondingly fast response times and damage prevention actions and/or recommendations for local situational emergency measures 18, and additional warning time for individuals and organizations that may be impacted by a seismic event.

The ability to synchronize time with high precision between different DAUs 16 enables installation of multiple DAUs 16 in close proximity and eliminates the need to connect all sensors 12 with long wired cables to a central controller. High precision time synchronization may be achieved in DAUs 16 by using a combination of GPS signal output from GPS receiver 102 and an optional temperature compensated crystal oscillator (TCXO) 110. In particular embodiments, DAUs 16 may comprise a GPS receiver 102 (see FIG. 4), which may be operatively connected to GPS satellites 20 to obtain precise time information. In situations where satellite communication is not available, DAUs 16 may be provided with an optional TCXO 110 which may be used to maintain the time accurately until satellite communication is re-established.

In particular embodiments, parameters and/or characteristics of seismic events (such as, by way of non-limiting example, epicenter of the earthquake, the magnitude of the surface wave (S-wave) associated with the earthquake and the time of arrival of the S-wave) can be determined locally by processor 100 based on input from sensors 12 in relation to a detected P-wave or S-wave. DAU 16 may provide multi-kilohertz sampling capability of the outputs of sensors 12 and sub-millisecond accuracy of the arrival times of the P-waves and S-waves associated with seismic events. In embodiments where components of system 10 (e.g. DAU 16, sensors 12 and devices 17) are locally connected with each other (e.g., via hard-wired connections or via a LAN), failures of wide(r) area networks (e.g. the internet or cellular communications networks) do not affect the operation of DAUs 16 and sensors 12 to provide local damage prevention actions and/or recommendations for local situational emergency measures 18 to devices 17, because each DAU 16 comprises its own local processing capabilities (processor 100—see FIG. 4).

Local situational emergency measures 18 may include, without limitation, local sirens, visual warnings/instructions/recommendations displayed on specialized displays, equipment displays, local computing devices and/or the like (together devices 17) locally connected via hardwiring or via LAN, automatic assumption of control or shutdown of devices 17, instructions issued over a local public address system and/or the like.

The local-wired communications between DAU 16, sensors 12 and devices 17 which receive local situational emergency measures 18 also reduce or eliminate the need for high data bandwidth, high reliability and high cost network infrastructure used to interconnect multiple systems or sensors located over large geographic areas. Since each DAU 16 can act autonomously, data from sensors 12 can be processed locally. The results of this processed data may be transmitted to other DAUs 16 (other local DAUs 16 or distributed DAUs 16, via the internet 15 or some other suitable wide area network) to provide additional early warning time if deemed necessary. This transmission of results between DAUs 16 may involve the use of minimal bandwidth (since results, rather than raw data can be transmitted) and can be implemented over low cost data communication infrastructure. Transmission of results between DAUs 16 is not required but may provide additional early warning to locations further away from the epicenter. Local-wired communications also means that sensors 12 or system 10 may be placed in remote areas where reliable network connectivity is unavailable or difficult to achieve.

In some embodiments, components within system 10 (e.g., DAU 16, sensors 12, additional sensors 13 and/or devices 17) may be connected wirelessly. In such cases, sensors 12, 13 and any wireless transceivers (not shown) may be powered using batteries, solar, wind, geothermal, or energy harvesting from the surrounding environment. If network communications are available, then DAU(s) 16 can transmit earthquake parameters to user computing devices 14 and/or other systems (not shown) via the internet 15 or other suitable wide area network. Such user computing devices 14 and/or other systems can decide to remotely implement damage prevention actions and/or recommendations for their own local situational emergency measures 18, based on the earthquake parameters determined and communicated by DAU 16.

In some embodiments, DAUs 16 may transmit and users may receive alarms, warnings and other forms of remote situational emergency measures 19 through the internet (or other wide area networks) 15 via remote devices 14; however, these remote situational emergency measures 19 would be subject to network delays and failures. In some embodiments, DAUs 16 may transmit determined event parameters or characteristics to user computing devices 14 and/or other systems (not shown) via the internet 15 or other suitable wide area network. Such user computing devices 14 and/or other systems can then decide on their own accord implement damage prevention actions, recommendations and/or other forms of remote situational emergency measures 19, based on the earthquake parameters/characteristics determined and communicated by DAU 16.

System 10 may also include a Controller Area Network (CAN) interface 21 which enables DAU(s) 16 to connect to vehicles and industrial controllers to obtain situational parameters and execute local situational emergency measures 18 that may be specific to the location or operating condition of the vehicle or industrial controller.

System 10 may further include a main server (not shown in FIG. 3) which may be interconnected with DAUs 16 and/or other prior art EEWS systems to form a large network covering a vast geographic area, although this is not a necessity. In some embodiments, such a main server may be implemented by one of DAUs 16. This interconnectivity between multiple DAUs 16 and/or with prior art EEWS systems, if available, may improve the accuracy of epicenter estimation and/or magnitude prediction. The improved accuracy may be due to data transmitted from a large number of sensors spread throughout a large geographic area. As discussed above in relation to FIGS. 1 and 2, if the sensors are further separated from each other, the accuracy of the epicenter estimation would be less dependent on timing accuracies and geological anomalies related to P-wave and S-wave propagation. Although this interconnectivity is not necessary for implementing the features of early warning, damage prevention actions and/or recommendations for local situational emergency measures 18, it may be used for remotely implementing local situational emergency measures 18.

System 10 can be connected to output damage prevention actions (which may be part of local situational emergency measures 18) to most types of electrical and/or mechanical devices 17 and such damage prevention actions may be used to automate shutdown of, or otherwise control the operation of, equipment, building structures, other infrastructure and systems that could be damaged during a disaster and cause more damage to the surrounding infrastructure and/or environment. By way of non-limiting example, tunnels can be closed to prevent additional vehicles from entering, trains can be stopped to prevent derailments, water systems can be shut off to prevent flooding, electricity can be shut off to prevent short circuits and fires, and pipelines can be shut down to prevent environmental damage.

Figure 7:
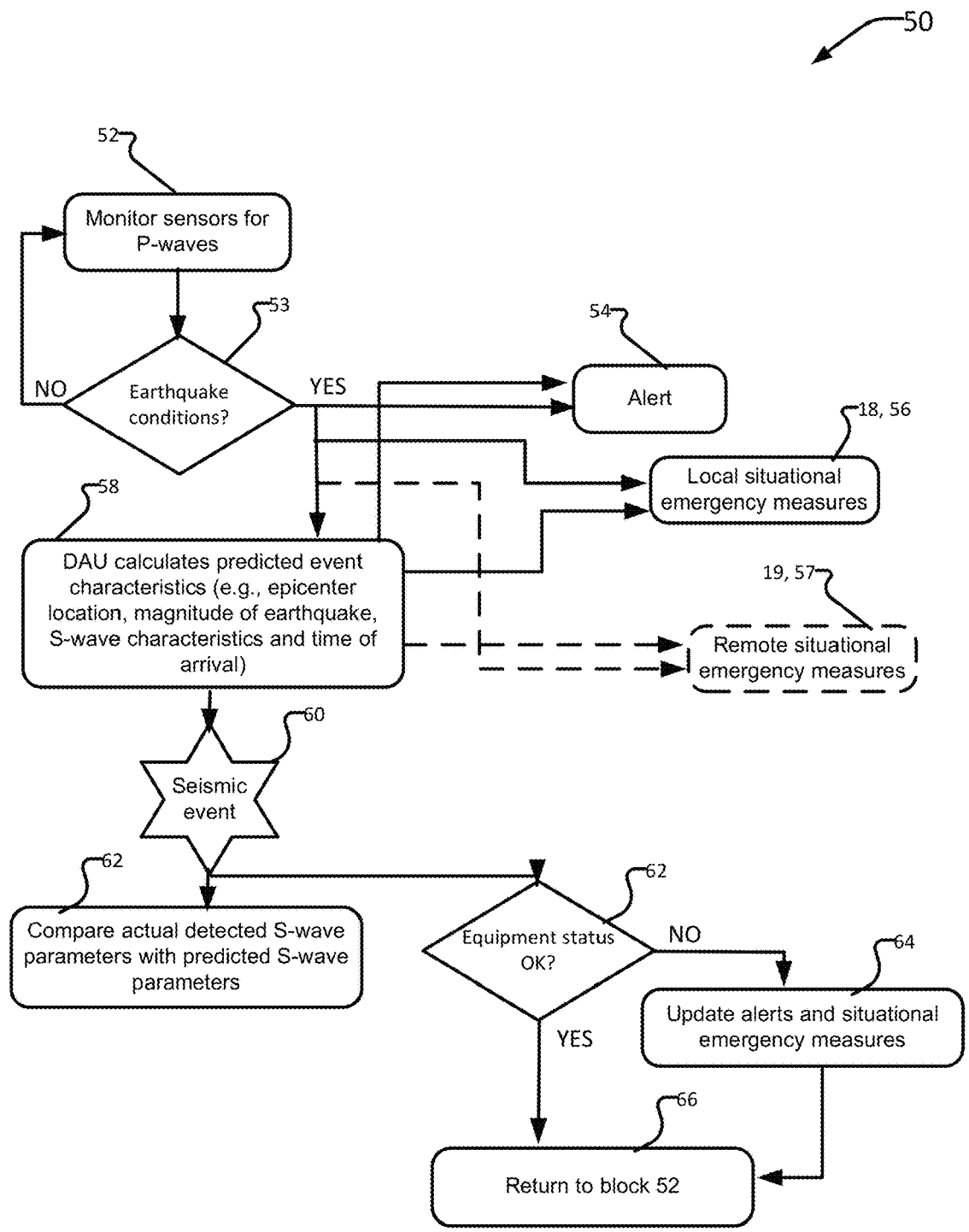
FIG. 7 is a flow chart illustrating the process of triggering local and, optionally, remote situational emergency measures upon sensing a seismic event according to an exemplary embodiment of the invention.

FIG. 7 illustrates an exemplary method 50 for initiating local situational emergency measures 18 and, optionally, remote situational emergency measures 19 upon sensing a seismic event. Method 50 may be performed by processor 100 of one or more (e.g. each of) DAUs 16 (see FIG. 4) in system 10. Method 50 begins in block 52, where DAU 16 monitors the outputs of its associated sensors 12. As discussed elsewhere herein, the outputs of sensors 12 are sensitive to P-waves and S-waves associated with seismic events. Sensors 12 may be located relatively close to one another—e.g. in a building, in an industrial site and/or the like. Sensors 12 need not be spaced by tens or hundreds of kilometers. In block 53, DAU 16 analyzes the output signals from its corresponding sensors 12 to determine if a detected P-wave comprises characteristics indicative of an earthquake. This block 53 determination may be based on comparing the amplitudes and/or frequencies of one or more sensor signals to corresponding threshold levels. Such threshold levels may be configurable (e.g. user configurable) depending on desired sensitivity. Such threshold levels may be dependent on the particular types of sensors 12 and signal conditioning circuitry (not shown) which are used in system 10. The block 53 determination is not limited to being based on amplitude and/or frequency thresholds alone and may be made on other characteristics of a detected P-wave which may be indicative of an earthquake.

DAU 16 continues to monitor sensors 12 (block 52 and block 53 NO branch) until it determines in block 53 that a detected P-wave is indicative of a seismic event. If DAU 16 determines that the incoming P-wave comprises characteristics indicative of an earthquake (block 53 YES branch), alerts (e.g., in the form of an audible, visual and/or electronic alarms, recommendations and/or the like) may be triggered (block 54) and local situational emergency measures 18 may be initiated (block 56) and, optionally, remote situational emergency measures 19 may be initiated in block 57. In particular embodiments, high priority and reliable data channels are used to communicate the block 54 alerts to users and to implement local situational emergency measures 18 in block 56. Remote situational emergency measures 19 implemented in block 57 may be similar to local situational emergency measures 18, except that DAU 16 may communicate such remote situational emergency measures 19 over the internet 15 or some other wide area network (see FIG. 3). High priority and reliable communications channels may be secured a priori with network communications service providers. The block 54 alerts may be effected and the block 56, 57 situational emergency measures 18 may be initiated as soon as P-waves having characteristics of earthquakes are detected in block 52 (i.e. before the arrival of the more damaging S-waves).

Local situational emergency measures 18 that may be initiated in block 56 may depend on the specific location at which the local situational emergency measures 18 are implemented. For example, local situational emergency measures 18 at the collar of an oil well may be different than local situational emergency measures 18 at the office located some distance away from the collar of the oil well. Local situational emergency measures 18 that may be initiated in block 56 may additionally or alternatively depend on specific situations that may be present at a particular time in the location where local situational emergency measures 18 are implemented. For example, local situational emergency measures 18 at the collar of an oil well may be different depending on whether or not drilling is active at the time that local situational emergency measures 18 are implemented. Local situational emergency measures 18 that may be initiated in block 56 may additionally or alternatively depend on specific situations determinable from the output of additional sensors 13 associated with devices 17. For example, additional sensors 13 associated with a drilling rig may detect the presence or absence of workers at some distance up the derrick oil well (e.g. at the racking (monkey) board or at the crown block of the derrick) and local situational emergency measures 18 may be different depending on whether workers are detected at such above-ground locations. Where local devices 17 (FIG. 3) have sufficient capability, suitable software operating on local devices 17 may be used to interrogate specific local conditions (e.g. data from additional sensors 13 or other available databases) and may be used in whole or in part to implement local situational emergency measures 18. Remote situational emergency measures 19 that may be initiated in block 57 may be similar to local situational emergency measures 18 initiated in block 56 (e.g. they may depend on specific locations, situations, times and/or sensor outputs where they are implemented), except that remote situational emergency measures 19 may be initiated over the internet 15 or other wide area network as opposed to locally. Where remote devices 14 (FIG. 3) have sufficient capability, suitable software operating on remote devices 14 may be used to interrogate specific local conditions and may be used in whole or in part to implement remote situational emergency measures 19.

In addition to effecting the block 54 alerts and initiating the block 56, 57 situational emergency measures 18, 19, DAU 16 is also configured, in block 58, to use the detected P-wave to determine or estimate a number of event characteristics (step 58). Exemplary event characteristics include earthquake epicenter, earthquake magnitude, predicted earthquake S-wave characteristics and earthquake time of arrival estimations (e.g. at the DAU location or at some other location(s) of interest). For example, an earthquake epicenter location may be determined or estimated by calculating the difference between the arrival times of the P-wave from different sensor locations along with geological P-wave characteristic data and geological data. The magnitude of the earthquake may be determined or estimated based on the epicenter location and the magnitude of the P-wave output signal. Based on the calculated epicenter location and the magnitude of the earthquake, S-wave characteristics and time of arrival at one or more locations of interest may be estimated.

The information determined in block 58 (which is ascertained prior to the arrival of the damaging S-wave) may be used in providing or updating alerts (block 54) and/or situational emergency measures 18, 19 (blocks 56, 57). For example, the degree of a block 54 alert may be based on information determined in block 58. Similarly, the specific local situational emergency measures 18 in block 56 and/or remote situational emergency measures 19 in block 57 may be based on event characteristics determined in block 58. Block 54 alerts and block 56, 57 situational emergency measures 18,19 provided prior to the arrival of the damage causing S-waves may help to mitigate human injury and damage to industrial equipment and/or building structures, loss due to unnecessary shut-down of industrial equipment and/or the like. Block 54 alerts and block 56, 57 situational emergency measures 18, 19 which are tailored based on block 58 event characteristics may further mitigate such injury, damage and/or loss.

The illustrative example shown in FIG. 7 assumes that an actual seismic event 60 occurs. In block 62, outputs from sensors 12 associated with DAU 16 are monitored to detect measured S-wave data and this measured S-wave data may be compared to the block 58 predicted S-wave characteristics. This optional block 62 comparison may be used to improve performance of system 10, for example, to validate S-wave prediction algorithm(s) or portion(s) thereof that may be used by system 10; to further tune S-wave detection algorithm(s) or portion(s) thereof that may be used by system 10; and/or the like.

After a seismic event 60, method 50 also comprises performing a post-event check in block 62 to ascertain the condition of buildings and or equipment of interest. The building and/or equipment of interest evaluated in block 62 may comprise local equipment comprising or otherwise associated with devices 17. The block 62 evaluation may be based on measured S-wave characteristics and data from additional sensors 13A, 13B (collectively, sensors 13) associated with devices 17 (e.g. equipment, building structures and/or other infrastructure of interest). Sensors 13 may, for example, comprise strain sensors, pressure sensors and or the like, which may be associated with the equipment, building structures and/or other infrastructure of interest (e.g. devices 17). If seismic event 60 causes excessive strain or stress on the buildings and/or equipment of interest (block 62 NO branch), then method proceeds to block 64 which involves updating alerts (block 54) and/or situational emergency measures 18, 19 (blocks 56, 57) based on the updated information associated with the actual seismic event 60. For example, in block 56, it may be determined (based on the P-wave and/or based on sensors local to a piece of equipment) that the piece of equipment is suitable for operation, but after the actual earthquake 60, it may be determined in block 64 that the equipment should be shut down to prevent future damage to the equipment, further damage to other equipment or buildings, further risk to individuals and/or the like. Block 64 may also involve recommending future maintenance decisions for the equipment, building structures and/or other infrastructure of interest and/or future design considerations for the equipment, building structures and/or other infrastructure of interest based on the output of sensors 13 and/or the measured S-wave characteristics.

After the conclusion of block 64 and/or on a block 62 YES branch, method 50 may return to block 52.

In some embodiments, system 10 comprises one or more alerting server(s) 51. Alerting server(s) 51 may comprise a virtual cloud of one or more server(s). In some embodiments, the functionality of alerting server(s) 51 is performed by DAU 16 (specifically, by alerting module 151 (FIG. 6), which may be performed by processor 100). In some embodiments, alerting server 51 is separate and distinct from DAU 16.

Security measures may be implemented to protect alerting server 51 from unwanted attacks or other malicious use (such as rogue insertion of false positives, or the manipulation of the server 51 to suppress alerts and/or generate false positives). In particular embodiments, security protections are in place to prevent inbound connections at the network layer from all senders other than those with explicit permission. In some embodiments, DAU 16 and alerting server 51 may be communicatively connected via a wired and/or wireless connection. In some embodiments, DAU 16 and alerting server 51 may be local to one another. In some embodiments, DAU and alerting server 51 may be remote from one another. In some embodiments, each DAU 16 must first be authenticated before any connections between DAU 16 and alerting server 51 can be enabled. In some embodiments, each DAU 16 can be identified by alerting server 51 via each DAU's current IP address and assigned time-limited authentication key.

Figure 8:
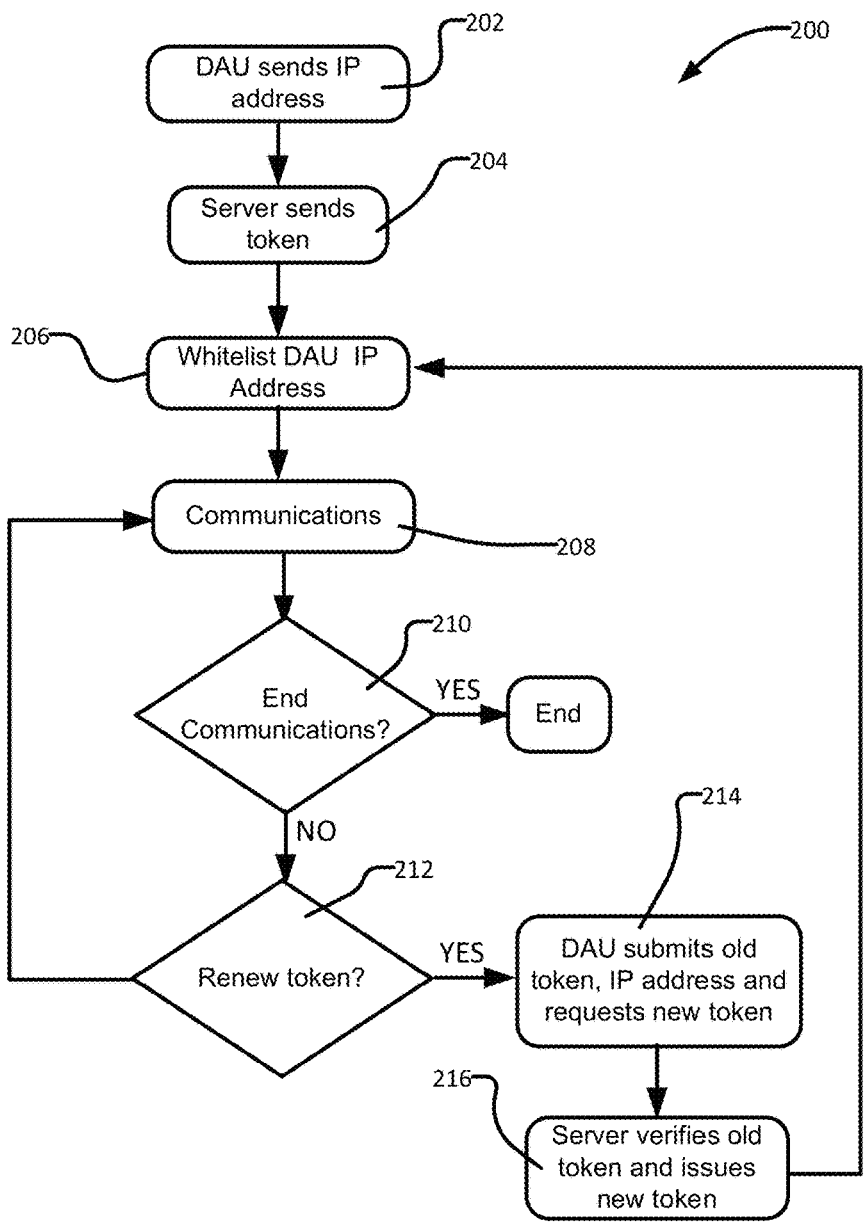
FIG. 8 is a flow chart illustrating the process of authenticating a DAU according to an exemplary embodiment of the invention.

FIG. 8 schematically depicts an exemplary authentication process 200 between a DAU 16 and an alerting server 51 according to a particular embodiment. Authentication process 200 may be performed in part by DAU 200 and in part by alerting server 51. Authentication process 200 of the illustrated embodiment starts in block 202 where a DAU 16 that wants to communicate with alerting server 51 transmits its current IP address to the alerting server 51. Upon receipt of the IP address of DAU 16, method 200 proceeds to block 204 where alerting server 51 transmits to DAU 16 an authentication key (hereinafter referred to as a "token"). The block 204 token may be used as an identifier by each DAU 16 to identify itself to the alerting server 51 to thereby authenticate future communications (e.g. in block 208) between DAU 16 and the alerting server 51. In block 206, alerting server 51 associates the current IP address and token of the respective DAU 16 and stores such information in a whitelist database to facilitate such future communications (e.g. in block 208). In block 208, the whitelisted DAU 16 and alerting server 51 communicate with one another as may be suitable in any particular circumstance. As part of block 204 and/or block 208, alerting server 51 may transmit a number of operational parameters to DAU 16. Such parameters may include, without limitation, a Distinguished Name (DN) for the node, any policy configuration parameters for alert transmission, and destination IP addresses to be used when DAU 16 communicates updates to the alerting server 51.

The block 204 token may include a validity period and expiration date. The token may, for example, be valid for a duration of 15 to 30 days; however, any suitable validity periods may be used. If, the expiry of a token is approaching (e.g. when a threshold amount (e.g. 85%) of the authentication period has expired) and continued communication is desired, then it may be desirable to renew the token (block 212 YES branch). It may additionally or alternatively be desirable to renew a token (block 212 YES branch) if the IP address of DAU 16 has changed (e.g. unexpectedly by the local internet connection service provider and/or the like).

If method 200 proceeds along the block 212 YES branch, then method 200 arrives at block 214, where DAU 16 submits its old token together with its (potentially new) IP address and requests a new token. In block 216, alerting server 51 verifies the old token and the (potentially new) IP address of the requesting DAU 16. Block 216 may involve matching the block 214 information with the whitelist database. Once the old token and IP address of the requesting DAU 16 has been verified, alerting server 51 sends a new token to DAU 16 as a part of block 216. Block 216 may optionally involve alerting server 51 sending operational parameters (such as those discussed above for blocks 204/208). Block 214 may optionally involve sending one or more confirmatory communications between the DAU 16 and alerting server 51. Method 200 then returns to block 206, where alerting server 51 updates the whitelist with information regarding the new token and IP address of DAU 16.

In particular embodiments, as part of the block 208 communications or otherwise, alerting server 51 transmits to DAU 16 operational updates (e.g. software updates, situational updates and/or the like) when such updates become available. Updates may be transmitted to DAU 16 via real-time or queued/batched mechanisms. Different communication links may be used for such update communications, depending on the bandwidth and connectivity of the available network connection. For example, if the available network connection has adequate bandwidth and reliable connectivity, DAU 16 may have a full-duplex persistent connection to alerting server 51. In such case, updates, if available, may be communicated immediately to DAU 16 as part of block 208 or otherwise. By contrast, if the available network connection has low bandwidth and poor connectivity, DAU 16 may not establish persistent connection with alerting server 51. In such case, updates may be transmitted to DAU 16 via a queued/batched mechanism as part of block 208 or otherwise. Any transmission of updates between alerting server 51 and DAU 16 will be interrupted when a seismic event occurs. In some embodiments, DAU 16 comprises protocols (e.g. software routines) to test any new update to ensure proper and successful installation prior to usage.

Referring to FIG. 3, alerting server(s) 51 are configured to deliver alerts to any registered users (i.e., individuals who have installed the system 10 software application on their devices 14) and unregistered users (i.e., individuals who do not have the system 10 application installed on their devices 14, but who have third-party application software that is programmatically linked to the system 10 infrastructure). In some embodiments, such alerts may comprise situational emergency measures 19. As discussed above, situational emergency measures 19 may depend on or otherwise be specific to the locations of devices 14 where they are implemented and may depend on specific conditions in existence at the locations of devices 14 where and/or times when they are implemented. Such specific location conditions may be determined based on output from additional sensors 13. Where remote devices 14 have sufficient capability, suitable software operating on remote devices 14 may be used to interrogate specific local conditions (e.g. from sensors 13 and/or other accessible databases) and may be used in whole or in part to implement, effect or otherwise provide situational emergency measures 19.

The decision as to whether alerting server(s) 51 may send such alerts to any particular user computing device 14 may depend on a number of criteria, which may include, without limitation, the current location of the particular device 14, the type/size/location or other characteristics of a detected seismic event, and the risk of assessment for immediate danger at the particular location of device 14. Alerting servers 14 may send alerts to particular third parties, who request alerts event in circumstances where their particular device 14 does not otherwise meet the alert criteria, but another device 14 and/or location of interest meets the alert criteria. For example, a parent may receive notifications about a seismic event which is a material risk to his/her child's school building. Similarly, a business operator may receive an alert if the building in which his/her business is located is at risk of major damage, even if the business operator isn't present at the location at the time of the event. In some embodiments, the software application may be configured to prioritize the display of situational emergency measures 19 on such third parties' devices 14. Specifically, each software application may be configured to first display guidance in respect of situational emergency measures 19 relevant to the current location of a device 14 if a seismic event is relevant at that current location. Alerts (including, possibly, situational emergency measures 19) in respect of other locations may be displayed subsequently or upon user request.

In particular embodiments, alerting server 51 is configured to apply one or more customized alerting policies to different users or groups of users depending on various parameters (e.g. user-configurable parameters). Such parameters may include, without limitation, the user's location (e.g. location of device 14), the type/size/location or other characteristics of a detected seismic event, and the risk of assessment for immediate danger at the location of the device 14. Such parameters may be configured by operators such as government or private entities. The one or more customized alerting policies (which may include situational emergency measures 19) may be preset by different operators, and may operate concurrently. Exemplary customized alerting policies include, without limitation, the following:

a government emergency alerting policy where alerts (which may include situational emergency measures 19) are provided to anyone within a given geographical region of any seismic event at or above a threshold magnitude; and an alerting policy unique to a particular facility such as a large office building where alerts (which may include situational emergency measures 19) are provided to all the workers (or specifically, those who are known to be in the building at the time of the report as reported by the location services on their devices 14) if any seismic event is detected to be at or above a threshold magnitude during business hours and/or if the type of seismic event is likely to cause structural damage to the particular building itself.

In particular embodiments, system 10 further comprises one or more notification servers 52. Notification server(s) 52 may comprise a virtual cloud of one or more server(s). In some embodiments, the functionality of notification server(s) 52 is performed by DAU 16 (specifically, by notification module 152 (FIG. 6), which may be performed by processor 100). In some embodiments, notification server 52 is separate and distinct from DAU 16. Alerting server(s) 51 may be configured to transmit alert(s) (which may include situational emergency measures 19) to the one or more notification server(s) 52. Notification servers 52 may be connected to one or more notification channels. Exemplary notification channels include, without limitation, "push notification" for smartphones 14 or similar PIDs 14, live connections to a government-run Emergency Alerting System (EAS) and/or the like. Alerting server(s) 51 may be configured to transmit alert(s) to the notification server(s) 52 via an Application Programming Interface (API) which comprises a number of parameters. Such parameters may include, without limitation, the time/date of the seismic event, the calculated magnitude of the seismic event, any uncertainty factors in respect of the accuracy in calculating the magnitude of the seismic event, and the location of the particular sensor 12 that first detected the event. Notification server(s) 52 may be configured to receive such alert(s) (which may include situational emergency measures 19) and transmit such alert(s) rapidly and directly to the one or more notification channels without applying further analysis or decision logic. In other respects, notification server(s) 52 and the alert(s) communication by notification server(s) 52 may be similar to notification servers 51 and the alert(s) communicated by alerting server 51 described herein.

As discussed above, alerting server 51 may be configured to deliver alerts to the devices 14 of any registered users and unregistered users meeting particular criteria. Alerting server 51 may also be configured to apply one or more customized alerting policies to different users or groups of users depending on various user-configurable parameters. One of such configurable parameters may be the current location of the user device 14. In particular embodiments, alerting server(s) 51 is configured to respond to requests from the user's device 14 about specific information related to the user's customized alerting policies prior to a seismic event. For example, if location signal(s) received via the GPS receiver of the user's device 14 has associated with it a customized alerting policy, the software application installed on the user's device 14 may download and cache alert data specific to that location of the user's device 14.

Downloadable alert data may include for example, infrastructure information and geological data about the area, optimized travel routes to and from the area, and information on the presence of any of the user's family members in the area. In some embodiments, alerting server 51 may request a particular user's device 14 to send location signal(s) via the GPS of the user's device 14 for emergency response or emergency notification purposes. In the event a seismic event occurs, situational emergency measures 19 (such as, for example, the locations of emergency exits or the recommended locations to find safety inside a building) may be displayed on the user's device 14. In some embodiments, any alert situational emergency measures 19 downloaded onto a user device 14 is not removed from such device 14 when the user leaves the particular location. In such case, the cached situational emergency measures 19 may be retained so that when the alerting server(s) 51 receives the same location signal from that particular device 14 in the future, situational emergency measures 19 may be rapidly made available to the user. The software application executed on device 14 may compare the cached copies of the situational emergency measures 19 against the current copies, and replaces the cached copies only if updates have been created.

In some embodiments, the software application installed on the user's device 14 may additionally include a database of customized alerting policies which may be available to system 10. The database may include information such as the geographic boundaries in which particular alert policies apply. The software application running on device 14 may be configured to compare the device's current location (obtained via the GPS of each device 14) with the database to determine whether the user has entered a geographic boundary in which a particular alerting policy applies. In some embodiments, the software application on each device 14 requests for updates to the database from alerting servers 51 at configurable time periods. In some embodiments, alerting servers 51 transmit to the software application on each device 14 any updates as they become available.

In some embodiments, the software application on each device 14 does not permit users to perform any administrative changes to the system. In such cases, the software application on each device 14 is intended to only comprise a display-only capability. In cases which operators wish to configure their own customized alerting policies, a separate software application may be used to allow operators to configure and test their customized alerting policies without delivering actual notifications to end users.

Figure 9:
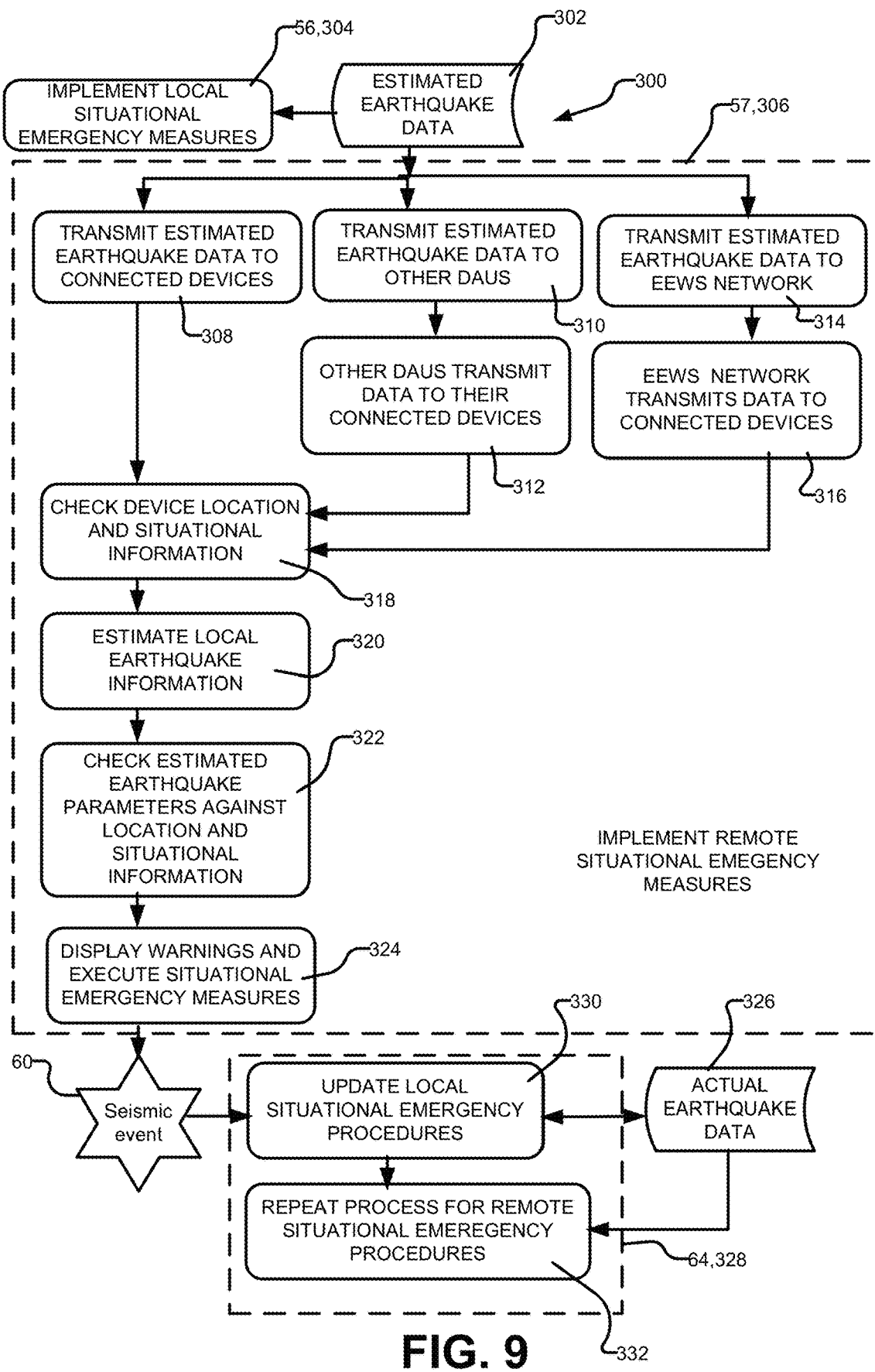
FIG. 9 is a flow chart illustrating the steps of operation at each software application installed on a Personal Internet Device (PID) and the communication between the application and the DAU when a seismic event occurs according to an exemplary embodiment of the invention.

FIG. 9 is a flow chart illustrating a method 300 of implementing situational emergency measures 18, 19 according to a particular embodiment. Method 300 may be performed by any combination of DAUs 16 (specifically, microprocessor 100 of DAU 16—see FIG. 4), servers 51, 52, local devices 17 and/or user computing devices 14. Method 300 may be used to perform block 56 (local situational emergency measures 18) and/or block 57 (remote situational emergency measures 19) of method 50 (FIG. 7). Method 300 may additionally or alternatively be used when situational emergency measures 18, 19 are updated in block 64 (FIG. 7). For the purpose of explaining method 300, it is assumed that the P-wave associated with a seismic event has been detected (see block 53 YES branch of method 50 (FIG. 7)) and that the expected characteristics of the S-wave associated with the seismic event have been predicted (see block 58 of method 50 (FIG. 7)). These estimated seismic event characteristics are represented in FIG. 9 by estimated earthquake data 302.

Method 300 involves using estimated earthquake data 302 to determine and implement local situational emergency measures 18 (in block 304) and, optionally, remote situational emergency measures 19 (in block 306). As discussed above, situational emergency measures 18, 19 are specific to particular locations in which such situational emergency measures 18, 19 are implemented and/or to specific conditions in existence at the locations where, and/or times when, such situational emergency measures 18, 19 are implemented. Local situational emergency measures 18 implemented in block 304 may be locally implemented—e.g. using a hardwired configuration or a local area network configuration and without having to use the internet 15 or any other external wide area network. In some embodiments, situational information (e.g. the locations of devices 17 and/or the specific conditions in existence at the locations where, and/or times when, and/or as measured by associated additional sensors 13 where, location situational emergency measures are implemented) may be known to device(s) 17 (at which the situational emergency measures 18 are implemented), to DAUs 16 and/or to other local devices 17. In such circumstances, some of the procedures of blocks 318, 320, 322 and/or 324 need not be performed for the local situational emergency measures 18 implemented in block 304. In some circumstances or embodiments, this a priori knowledge may not be known and implementing local emergency measures 18 in block 304 may involve procedures similar to any of those of blocks 318, 320, 322 and/or 324 described in more detail below.

This a priori knowledge may not (and typically does not) exist in the case of the remote situational emergency measures 19 implemented in block 306 of method 300. Block 306 may comprise transmitting the estimated earthquake data 302 to connected devices 14 (block 308). The block 308 procedure may involve communicating with remote devices 14 which are programmed to operate with application software specific to system 10 (FIG. 3). In addition, in block 310, the estimated earthquake data 302 may optionally be transmitted to remote DAUs 16, which may in turn transmit the estimated earthquake data 302 to their connected devices 14 (in block 312). The block 312 procedure may be similar to the block 308 procedure, except for block 312 may involve different DAUs 16 and different devices 14. Still further, in block 314, estimated earthquake data 52 may optionally be transmitted to one or more other external earthquake early warning system (EEWS) networks, which may then transmit this estimated earthquake information to additional connected devices 14 (block 316). The devices 14 to which the estimated earthquake data 52 is sent in block 316 may comprise devices 14 that are not running application software specific to system 10 (although this is not necessary).

At the conclusion of blocks 308, 312, 316, any device 14 receiving the estimated earthquake data 302 may become involved in implementing situational emergency measures 19 that are specific to the location of the particular device and/or to specific conditions in existence at the locations where, and/or times when, and/or as measured by associated additional sensors 13 where, such situational emergency measures 19 are implemented. This portion of block 306 may start in block 318, where each device 14 checks for its location (if available, for example, via GPS receiver that forms part of the device) and, in some circumstances, checks for situational information. Such situational information may include any information related to specific conditions in existence at the locations where, and/or times when, and/or as measured by associated additional sensors 13 where, block 318 is performed. Situational information may comprise, for example, information accessible in databases of infrastructure information, customized alerting policies, alert data for various locations, such as infrastructure construction type, construction materials, building foundation type, building design parameters, building age, remote gas and/or electricity shut off locations, commuting patterns, locations where people accumulate (e.g. schools, arenas, etc.), optimized routes to nearby hospitals, information from associated sensors 13 and/or the like. By way of specific example, device 14 may comprise a computer associated with a piece of equipment, and the situational information ascertained in block 318 may comprise an operational state of the equipment, as measured by an associated sensor 13. As another example, the location information associated with a device 14 may determine that the device is inside a particular building and situational information may include a seismic upgrade database that advises that this particular building has undergone recent seismic upgrades. As still another example, the situational information may ascertain that there is no parking on a particular roadway at a particular time and, consequently, it would be unwise to stop a vehicle. It will be appreciated that there are many examples of situational information that could be determined in association with a particular device 14.

Method 300 then proceeds to block 320 which involves estimating local earthquake information at the location of device 14. The block 320 local earthquake information may be based on device location information determined in block 318 (if available) and estimated earthquake information 52 that is transmitted to device 14, via one of blocks 308, 312, 316. If the specific location of a particular device is not known in block 320 (e.g. because a device 14 does not know or cannot ascertain its location), then block 320 may assume that device 14 is relatively close to the epicenter of the seismic event. Method 300 may then proceed to block 322 which may involve checking the block 320 local earthquake characteristic estimates against the block 318 location and situational information. Then, based on this block 322 comparison, specific situational emergency measures may be implemented in block 324. For example, in some circumstances, the block 318 situational information may ascertain that a device 14 is located in a building with a seismic rating up to a particular threshold. The block 320 local information may determine that the estimated earthquake parameters at the location of device 14 may be above or below this threshold and the block 324 situational emergency measures 19 may depend on the block 322 comparison of the block 320 local earthquake estimates to the block 318 seismic thresholds.

Eventually, the seismic event 60 occurs. After the occurrence of seismic event 60, system 10 generates actual (i.e. measured) earthquake data 326 in relation to the actual seismic event 60. Method 300 may then proceed to block 328 which may implement block 64 of method 50 (FIG. 7) and may involve updating alerts and/or situational emergency measures 18, 19 implemented in blocks 304, 306 based on the updated earthquake data 326 associated with actual seismic event 60. Block 328 may comprise block 330 which may update local situational emergency measures 18 and block 332 which may update remote situational emergency measures 19. Blocks 330, 332 may be respectively similar to blocks 304, 306 described herein, except that blocks 330, 332 may use actual earthquake data 326 in the place of estimated earthquake data 302.

System 10 may be provided with a user-friendly graphical interface (e.g. operating on user computing devices 14 and/or on devices 17 and/or on DAUs 16) which can be accessed via standard web-browsers from Internet-connected devices 14, 17 and/or DAUs 16 or via applications on user computing devices 14, devices 17 and/or DAUs 16. Applications performed on user computing devices 14 may also allow for pre-programming emergency contacts that can be reached via device 14 and/or an associated communication device. Pre-programming of emergency contacts may permit high priority communication with relatives and friends, and emergency response teams through highly reliable data channels, which may be secured through prior agreements with cellular service providers, for example. In some embodiments, an administrator user interface (e.g. operating on one or more user computing devices 14) may be provided to adjust various parameters or features of $DAU_{16}$ and/or other aspects of system 10.

When operating on a personal internet device (PID) 14, such as a mobile telephone or the like, the application software operating on device 14 may have access to the PID's sensors (which may embody additional sensors 13)

and/or network information, including, for example, GPS information, IP address and/or the like, which may in turn enable the application software to know the geographical location of PID 14. Knowing the geographical location of PID 14 enables system 10 to remotely provide the individual associated with PID 14 with recommendations for remote situational emergency measures 19. In addition, the application operating on device 14 may be able to access databases of infrastructure structural information, infrastructure type, geological information and/or the like to tailor the remote situational emergency measures 19 to the individual's location.

For example, system 10 may determine that an individual (and his/her PID 14) are located at a particular geographic location and an infrastructure information database may indicate that the particular geographic location is associated with a multi-story brick building. The infrastructure information database may provide an indication that the corresponding building has been upgraded with earthquake proofing technology capable of withstanding earthquakes up to a particular magnitude. In such circumstances, system 10 may remotely provide user computing device 14 with remote situational emergency measures 19 which may depend on the level of the expected earthquake at the particular geographic location. For example, if the expected earthquake at the particular geographic location is less than the building's earthquake-proofness level, then a first remote situational emergency measure 19 may be recommended, but if the expected earthquake at the particular geographic location is greater than the building's earthquake-proofness level, then a second remote situational emergency measure 19 (different from the first remote situational emergency measure 19) may be recommended. In addition, if the app associated with a particular PID 14 determines that the sensor data does not warrant an alarm, an all-clear message may be displayed on the device 14.

System 10 can be set up with double or triple redundancy, minimizing the risk of false alarms This redundancy may be provided by having a redundant number of DAUs 16 and/or a redundant number of sensors 12. As a non-limiting example, if two identical systems of DAUs 16 and sensors 12 are installed at a given location, the DAUs 16 can be interconnected such that the block 53 YES branch (FIG. 7) is only reached when both sensor/DAU systems detect a P-wave. If only one sensor/DAU system detects a P-wave, the event may be treated as a false positive and method 50 (FIG. 7) may exit block 53 via the NO branch. This redundancy may significantly improve the reliability of system 10. DAU 16 may use the P-wave detection algorithm and S-wave prediction techniques associated with the ShakeAlarm® seismic detection products manufactured and sold by Weir-Jones Engineering of Vancouver, British Columbia, Canada.

In some embodiments, system 10, which is already connected to the internet 15 and/or other communication networks, may act as a monitor and/or message relay (e.g. through a mobile application on user computing devices 14). This creates a very efficient mesh network with multiple channels of communications between parties. Messages can easily be monitored by emergency response teams and services can be prioritized based on real information from the affected zone. The application may be configured to prioritize data based on readings from the local sensors on the device 14. Local device 14 sensors include, for example, GPS sensor and accelerometers. Local device 14 sensors may be configured to measure the device's proximity to the epicenter. The priority level given to the particular data may depend on the proximity of the device 14 used to transmit that particular data. For example, if the device's GPS sensor indicates that the device 14 is very close to the epicenter, the message transmitted from that particular device 14 may be given a high priority. Another example is that if the signal from the device's accelerometer reads high levels of shaking and motion and that the device's GPS sensor indicates that the device is very close to the epicenter, the message transmitted from that particular device 14 may be given an even higher priority. To reduce the risk of false alarms, messages may be sent with accompanying information generated by the DAUs 16 and/or device 14 sensors. For example, if a user transmits a message which indicates that he/she is trapped under earthquake rubble, but his/her device 14 sensors indicate that the user is far away from the epicenter, then the message may be tagged as a low priority since it is likely a false alarm.

The application operating on devices 14 can be pre-programmed with an individual's emergency contact numbers. The device 14 can then inform the emergency contacts of the individual's condition and/or whereabouts through voice messaging, text messaging, email messaging, internet based instant messaging and/or the like. High priority and reliable data channels can be secured through prior agreements with network communication service providers, resulting in timely and efficient delivery of messages over highly congested networks.

As discussed above, FIG. 6 schematically illustrates a non-limiting set of the software modules which are implemented processor 100 of DAU 16 according to an exemplary embodiment of the invention. The software modules illustrated in FIG. 6 include:

data input module 154 which receives data from sensors 12, formats the received data and passes the data to the circular memory buffer 156;

circular memory buffer 156 which stores received data and when the buffer becomes full, the oldest data is overwritten;

real-time network feed 158 which transfers the data from circular memory buffer 156 to other network servers (not shown in FIG. 6) for further analysis if a network connection exists. Real-time network feed 158 may also receive alerts and events (e.g. remote situational emergency measures 19 or alerts which may be used to generate such situational emergency measured) from other servers and DAUs 16 if a network connection exists and may forward this information to other software modules;

file writer 160 which takes data from circular memory buffer 156, reformats the data and passes the data to the file format writer 162;

file format writer 162 which writes the data received from file writer 160 to a file on a memory (e.g. memory 104 (FIG. 4)) that is part of or otherwise accessible to DAU 16;

analysis module 164 which analyzes data from circular memory buffer 156 to determine if an event (P-wave or S-wave event) has occurred and the characteristics of any such event. If an event has occurred, event characteristics generated by analysis module 164 may be sent to alerting module 151, notification module 152, local emergency measures module 166 and reporting module 168;

reporting module 168 which handles any reporting and logging functions which ma y be configured for DAU 16;

local emergency measures module 166 which may determine local situational emergency measures 18 (e.g. on the basis of characteristics of events determined by analysis module 164 and any local situational which may be programmed into, or otherwise available to local emergency measures module 166) and/or execute any local emergency measures 18 that local emergency measures module 166 may be programmed to implement. As discussed above, such local emergency measures 18 may comprise a wide variety of actions, such, such as turning on alarms, sending out specific messages to specific staff, turning off certain utilities, and/or the like;

notification module 152 which may communicates event and status notifications through various notification channels, such as "push notifications" for smartphones 14 or similar PIDs 14, live connections to a government-run Emergency Alerting System (EAS) and/or the like;

alerting module 151 which may communicates alerts to other notification servers 51, as discussed above;

remote access module 170 which enables secure login of a network computer or server into DAU 16 for diagnostic and maintenance purposes;

configuration module 172 which performs validation of the system configuration on boot-up;

local access module 174 which receives inputs from local input devices, such as keypads, switches and tap sensors, and makes these inputs know to the other modules;

logger 176 which may comprise a text file logging module that can be invoked by any module to store operational parameters, such as process parameters, times and OS events, in the system log; and health monitor 178 which performs regular diagnostics on the system and reports back on the overall system health.

Although the present system 10 is described for use in EEWS applications, system 10 is not limited to EEWS applications. System 10 can additionally or alternatively be used for any disaster warning applications by using appropriate sensor(s) 12 and suitable modification of the sensor data analysis algorithms. Such disasters may include, without limitation, tsunamis, tornados, cyclones, hurricanes, and floods. In addition to disaster warning applications, system 10 can also be used in any application where damage prevention actions and/or recommendations for local and remote situational emergency measures 18, 19 may be of benefit. Such applications include, but are not limited to remote security, pipeline monitoring, marine vehicle monitoring, bridge monitoring, rail monitoring, and mine geology monitoring.

Embodiments of the invention may be implemented using specifically designed hardware, configurable hardware, programmable data processors (e.g. processor 100 and/or any other processors described herein) configured by the provision of software (which may optionally comprise "firmware") capable of executing on the data processors, special purpose computers or data processors that are specifically programmed, configured, or constructed to perform one or more steps in a method and/or to provide the functionality as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods and/or provide functionality as described herein by executing software instructions in a program memory accessible to the processors.

While processes or blocks of some methods are presented herein in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, media players, PIDs and other devices suitable for the purposes described herein. Those skilled in the relevant art will appreciate that aspects of the system can be practiced with other communications, data processing, or computer system configurations, including: internet appliances, hand-held devices (including personal digital assistants (PDAs)), wearable computers, all manner of cellular or mobile phones, multi-processor systems, microprocessor-based or programmable consumer electronics, network PCs, mini-computers, mainframe computers, and the like.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

What is claimed is:

1. A seismic warning system comprising:
a plurality of sensors, each sensor sensitive to a physical phenomenon associated with seismic events and operative to output an electronic signal representative of the sensed physical phenomenon;
a data acquisition unit communicatively coupled to receive the electronic signal from each of the plurality of sensors, the data acquisition unit comprising a processor configured to determine that the received electronic signals are indicative of a P-wave associated with a seismic event and to estimate characteristics of the seismic event based on the received electronic signals; and
an electronic device embodied separately from the data acquisition unit and communicatively coupled to the data acquisition unit;
wherein at least one of the processor and the electronic device are configured to determine situational emergency measures to be implemented by the electronic device based on the estimated characteristics of the seismic event and specific conditions in existence at a specific location of the electronic device;
wherein the electronic device is configured to determine the specific conditions in existence at the specific location of the electronic device by performing an interrogation operation; and
wherein the interrogation operation causes the electronic device to access, via a wide area network, an infrastructure database having information relevant to building infrastructure at the specific location of the electronic device and wherein the specific conditions comprise the accessed information relevant to building infrastructure at the specific location of the electronic device, such that the situational emergency measures are based at least in part on the accessed information relevant to building infrastructure at the specific location of the electronic device.

2. The seismic warning system according to claim 1 wherein at least one of the processor and the electronic device are configured to determine the situational emergency measures to be implemented by the electronic device based on a time when the situational emergency measures are determined.

3. The seismic warning system according to claim 1 comprising an additional sensor associated with the electronic device for measuring one or more phenomena and wherein the interrogation operation causes the electronic device to determine the specific conditions based on output from the additional sensor, such that the situational emergency measures are based at least in part on the output from the additional sensor.

4. The seismic warning system according to claim 3 wherein the additional sensor is located at the specific location of the electronic device.

5. The seismic warning system according to claim 1 wherein the electronic device comprises an embedded controller of industrial equipment and wherein the interrogation operation causes the electronic device to determine an operational state of the industrial equipment and wherein the specific conditions comprise the determined operational state of the industrial equipment such that the situational emergency measures are based at least in part on the operational state of the industrial equipment.

6. The seismic warning system according to claim 5 comprising an additional equipment sensor associated with the industrial equipment for measuring one or more phenomena associated with the industrial equipment, and wherein the interrogation operation causes the electronic device to determine the specific conditions based on output from the additional equipment sensor, such that the situational emergency measures are based at least in part on the output from the additional equipment sensor.

7. The seismic warning system according to claim 5 wherein the situational emergency measures implemented by the electronic device comprise causing the embedded controller to assume emergency operational control of the industrial equipment.

8. The seismic warning system according to claim 5 wherein the situational emergency measures implemented by the electronic device comprise causing the embedded controller to implement an emergency operational shutdown of the industrial equipment.

9. The seismic warning system according to claim 1 wherein at least one of the processor and the electronic device are configured to determine the situational emergency measures to be implemented by the electronic device based on output from an additional sensor which measures one or more phenomena representative of damage caused by an S-wave of a seismic event.

10. The seismic warning system according to claim 1 wherein the estimated characteristics of the seismic event include an estimated epicenter of the seismic event and wherein the situational emergency measures implemented by the electronic device are based at least in part on a proximity of the electronic device to the estimated epicenter.

11. A seismic warning system comprising:
a plurality of sensors, each sensor sensitive to a physical phenomenon associated with seismic events and operative to output an electronic signal representative of the sensed physical phenomenon;
a data acquisition unit communicatively coupled to receive the electronic signal from each of the plurality of sensors, the data acquisition unit comprising a processor configured to determine that the received electronic signals are indicative of a P-wave associated with a seismic event and to estimate characteristics of the seismic event based on the received electronic signals; and
an electronic device embodied separately from the data acquisition unit and communicatively coupled to the data acquisition unit;
wherein at least one of the processor and the electronic device are configured to determine situational emergency measures to be implemented by the electronic device based on the estimated characteristics of the seismic event and specific conditions in existence at a specific location of the electronic device;
wherein the electronic device is configured to determine the specific conditions in existence at the specific location of the electronic device by performing an interrogation operation; and
wherein the electronic device comprises a remote computing device communicatively coupled to the data acquisition unit to receive the estimated characteristics of the seismic event from the data acquisition unit via a wide area data communication network.

12. The seismic warning system according to claim 11 wherein the at least one of the processor and the remote computing device are configured to determine the situational emergency measures based on the estimated characteristics of the seismic event and specific remote conditions in existence at the specific location of the remote computing device; and wherein the remote device is configured to determine the specific remote conditions in existence at the specific location of the remote device by performing an interrogation operation.

13. A seismic warning system comprising:
a plurality of sensors, each sensor sensitive to a physical phenomenon associated with seismic events and operative to output an electronic signal representative of the sensed physical phenomenon;
a data acquisition unit communicatively coupled to receive the electronic signal from each of the plurality of sensors, the data acquisition unit comprising a processor configured to determine that the received electronic signals are indicative of a P-wave associated with a seismic event and to estimate characteristics of the seismic event based on the received electronic signals;
a remote computing device embodied separately from the data acquisition unit and communicatively coupled to the data acquisition unit to receive the estimated characteristics of the seismic event from the data acquisition unit via a wide area data communication network; and
wherein at least one of the processor and the remote computing device are configured to determine situational emergency measures to be implemented by the remote computing device based on the estimated characteristics of the seismic event and specific conditions in existence at a specific location of the remote computing device; and
wherein the remote computing device is configured to determine the specific conditions in existence at the specific location of the remote computing device by performing an interrogation operation.

14. The seismic warning system according to claim 13 wherein at least one of the processor and the remote computing device are configured to determine the situational emergency measures to be implemented by the remote computing device based on the estimated characteristics of the seismic event and a specific location of the remote computing device.

15. The seismic warning system according to claim 13 wherein the interrogation operation causes the remote computing device to access, via a wide area network, an infrastructure database having information relevant to building infrastructure at the specific location of the remote computing device and wherein the specific remote conditions comprise the accessed information relevant to building infrastructure at the specific location of the remote computing device, such that the situational emergency measures are based at least in part on the accessed information relevant to building infrastructure at the specific location of the remote computing device.

16. The seismic warning system according to claim 13 wherein at least one of the processor and the remote computing device are configured to determine the situational emergency measures to be implemented by the remote computing device based on a time when the situational emergency measures are determined.

17. The seismic warning system according to claim 13 comprising an additional remote sensor associated with the remote computing device for measuring one or more phenomena and wherein the interrogation operation causes the remote computing device to determine the specific remote conditions based on output from the additional remote sensor, such that the situational emergency measures are based at least in part on the output from the additional remote sensor.

18. A method for effecting situational emergency measures in response to detected seismic events, the method comprising:
at each of a plurality of seismic sensors, detecting a physical phenomenon associated with seismic events and generating a corresponding electronic signal representative of the detected physical phenomenon;
receiving, from each seismic sensor, the corresponding electronic signal at a data acquisition unit;
determining, at the data acquisition unit, that the received electronic signals are indicative of a P-wave associated with a seismic event and computing, at the data acquisition unit, one or more estimated seismic event characteristics based on the received electronic signals;
communicating the one or more estimated seismic event characteristics from the data processing unit to an electronic device and embodied separately from the data acquisition unit;
determining, by at least one of the data acquisition unit and the electronic device, situational emergency measures to be implemented by the electronic device based on the estimated characteristics of the seismic event and specific conditions in existence at a specific location of the electronic device;
determining, by the electronic device, the specific conditions in existence at the specific location of the electronic device by performing an interrogation operation; and
wherein performing the interrogation operation comprises accessing, via a wide area network, an infrastructure database having information relevant to building infrastructure at the specific location of the electronic device and wherein the specific conditions comprise the accessed information relevant to building infrastructure at the specific location of the electronic device, such that the situational emergency measures are based at least in part on the accessed information relevant to building infrastructure at the specific location of the electronic device.

19. The method according to claim 18 wherein the electronic device comprises an embedded controller of industrial equipment and wherein performing the interrogation operation comprises determining an operational state of the industrial equipment and wherein the specific conditions comprise the determined operational state of the industrial equipment such that the situational emergency measures are based at least in part on the operational state of the industrial equipment.

20. The method according to claim 19 wherein the situational emergency measures implemented by the electronic device comprise causing the embedded controller to assume emergency operational control of the industrial equipment.

* * * * *